United States Patent
Zhang et al.

(10) Patent No.: US 11,083,966 B2
(45) Date of Patent: Aug. 10, 2021

(54) METHOD AND APPARATUS FOR DISPLAYING VIRTUAL PET, TERMINAL, AND STORAGE MEDIUM

(71) Applicant: Tencent Technology (Shenzhen) Company Limited, Guangdong (CN)

(72) Inventors: Yicheng Zhang, Guangdong (CN); Yanwei Zhang, Guangdong (CN); Xing He, Guangdong (CN); Wei Peng, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/028,376

(22) Filed: Sep. 22, 2020

(65) Prior Publication Data

US 2021/0001223 A1   Jan. 7, 2021

Related U.S. Application Data

(63) Continuation of application No. PCT/CN2019/102132, filed on Aug. 23, 2019.

(30) Foreign Application Priority Data

Aug. 30, 2018 (CN) .......................... 201811006228.6

(51) Int. Cl.
*A63F 13/537* (2014.01)
*A63F 13/825* (2014.01)

(52) U.S. Cl.
CPC .......... *A63F 13/537* (2014.09); *A63F 13/825* (2014.09)

(58) Field of Classification Search
CPC .............................. A63F 13/537; A63F 13/75
See application file for complete search history.

(56) References Cited

U.S. PATENT DOCUMENTS

| | | | |
|---|---|---|---|
| 2005/0137015 A1* | 6/2005 | Rogers ................ | G06Q 30/02 463/42 |
| 2005/0168486 A1* | 8/2005 | Sato .................... | A63F 13/10 345/633 |
| 2007/0111795 A1* | 5/2007 | Choi .................... | A63F 13/825 463/42 |

(Continued)

FOREIGN PATENT DOCUMENTS

| CN | 107317725 A | 11/2017 |
|---|---|---|
| CN | 109260707 A | 1/2019 |

OTHER PUBLICATIONS

"How to obtain a virtual pet"; downloaded from the Internet on Oct. 10, 2019 at https://jingyan.baidu.com/article/cb5d6105d3d04f005c2fe095.html; nine pages.

(Continued)

*Primary Examiner* — Reginald A Renwick
(74) *Attorney, Agent, or Firm* — Brinks Gilson & Lione

(57) ABSTRACT

A method for displaying a virtual pet is provided. The method includes: determining a target virtual pet to-be-displayed in an application program; obtaining first information of the target virtual pet from a server, the first information being stored on a blockchain system and corresponding to the target virtual pet; and displaying a first display interface associated the target virtual pet, the first display interface including the first information of the target virtual pet.

20 Claims, 24 Drawing Sheets

(56) References Cited

U.S. PATENT DOCUMENTS

2017/0052676 A1* 2/2017 Pulier ................. G06F 3/04883
2018/0204416 A1   7/2018 Perea-Ochoa
2019/0192971 A1* 6/2019 Eatedali ................. A63F 13/58

OTHER PUBLICATIONS

"Case studies for Blockchain and games"; downloaded from the Internet on Oct. 10, 2019 at https://www.100ec.cn/detail--6445808.html; eight pages.

"How to breed virtual dogs"; downloaded from the Internet on Oct. 10, 2019 at https://jingyan.baidu.com/article/ed15cb1badf0a91be36981aa.html; nine pages.

International Search Report and Written Opinion dated Nov. 22, 2019 for PCT Application No. PCT/CN2019/102132, ten pages.

First Office Action dated Oct. 23, 2019 for Chinese Patent Application No. 201811006228.6; 12 pages.

Second Office Action dated Jan. 10, 2020 for Chinese Patent Application No. 201811006228.6; 12 pages.

Third Office Action dated Mar. 10, 2020 for Chinese Patent Application No. 201811006228.6; 13 pages.

Chinese Search Report dated Oct. 11, 2019 for Chinese Patent Application No. 201811006228.6; 3 pages.

\* cited by examiner

METHOD AND APPARATUS FOR DISPLAYING VIRTUAL PET, TERMINAL, AND STORAGE MEDIUM

RELATED APPLICATION

This application is a continuation and claims priority to the PCT International Application No. PCT/CN2019/102132, filed with the China National Intellectual Property Administration on Aug. 23, 2019, which claims priority to Chinese Patent Application No. 201811006228.6, entitled "METHOD AND APPARATUS FOR DISPLAYING VIRTUAL PET, DEVICE, AND STORAGE MEDIUM" filed with the China National Intellectual Property Administration on Aug. 30, 2018, which are incorporated herein by reference in their entireties.

FIELD OF THE TECHNOLOGY

Embodiments of this application relate to the field of computer graphics, and in particular, to a method and apparatus for displaying a virtual pet.

BACKGROUND OF THE DISCLOSURE

Some application programs are provided with virtual pets, and the virtual pets may associated with various animal images or cartoon images.

When a virtual pet is displayed in an application program, the related art provides a display user interface for a virtual pet. An extrinsic image of the virtual pet and various types of value attribute information are displayed on the display user interface. The various types of value attribute information include but are not limited to: at least one of a nickname of the virtual pet, a level of the virtual pet, a skill of the virtual pet, hit points of the virtual pet, magic points of the virtual pet, attack power of the virtual pet, and defense power of the virtual pet.

The foregoing display interface is mainly used for displaying the value attribute information of the virtual pet, but it is easy to tamper with and replicate the value attribute information. Consequently, information displayed on the display user interface may be tampered with or replicated from another virtual pet.

SUMMARY

A method for performed in a platform for maintaining a type of virtual pets is disclosed. The method may include determining a target virtual pet to be displayed in an application program; generating a plurality of initial gene sequences associated with the type of virtual pets; generating a plurality of zeroth generation virtual pets corresponding to the plurality of initial gene sequences; generating a plurality of higher generation virtual pets originating from the plurality of zeroth generation virtual pets via a set of virtual breeding events, each of the plurality of higher generation virtual pets comprising a gene sequence generated using a genetic inheritance algorithm; maintaining a uniqueness of the gene sequences among the plurality of zeroth and higher generation virtual pets; storing a set of data items for each of the plurality of zeroth and higher generation virtual pets in a blockchain system; and transacting at least one virtual pet of the plurality of zeroth and higher generation virtual pets via the blockchain system, wherein each of the plurality of zeroth and higher generation virtual pets are associated with a set of intrinsic characteristics and extrinsic characteristics determined by a corresponding gene sequence.

A method for displaying a virtual pet is provided, performed by a terminal having an application program provided with a virtual pet, and at least one pet image of the virtual pet being generated based on a genetic inheritance rule, the method including:

determining a target virtual pet to be displayed in an application program;

obtaining first information of the target virtual pet from a server, the first information being stored on a blockchain system and corresponding to the target virtual pet; and displaying a first display interface associated with the target virtual pet, the first display interface including the first information of the target virtual pet.

A method for displaying a virtual pet is provided, performed by a server, the method including:

receiving a first obtaining request transmitted by a terminal, the first obtaining request being transmitted by the terminal after the terminal determines a target virtual pet to be displayed in an application program;

extracting a pet identifier of the target virtual pet on a blockchain system from the first obtaining request;

obtaining first information of the target virtual pet from the blockchain system according to the pet identifier; and transmitting the first information to the terminal, the first information being used by the terminal to display a first display interface of the target virtual pet.

In an embodiment, before the terminal determines the target virtual pet to be displayed in the application program, the method includes:

receiving a preview obtaining request transmitted by the terminal;

extracting a current user account from the preview obtaining request;

determining a corresponding target account of the current user account on the blockchain system;

obtaining summary information of m virtual pets from the blockchain system according to the target account; and transmitting the summary information of the m virtual pets to the terminal, the summary information being used by the terminal to display a pet preview interface.

In an embodiment, before the terminal determines the target virtual pet to be displayed in the application program, the method further includes:

receiving a node information obtaining request transmitted by the terminal;

obtaining node status information of n blockchain nodes from the blockchain system, n being a positive integer; and transmitting the node status information of the n blockchain nodes to the terminal, the node status information of the n blockchain nodes being used by the terminal to display a fourth display interface.

An apparatus for displaying a virtual pet is provided, including:

a determining module, configured to determine a target virtual pet to be displayed in an application program;

an obtaining module, configured to obtain first information of the target virtual pet from a server, the first information being stored on a blockchain system and corresponding to the target virtual pet; and a display module, configured to display a first display interface of the target virtual pet, the first display interface including the first information of the target virtual pet.

An apparatus for displaying a virtual pet is provided, including:

a receiving module, configured to receive a first obtaining request transmitted by a terminal, the first obtaining request being transmitted by the terminal after the terminal determines a target virtual pet to be displayed in an application program;

an extraction module, configured to extract a pet identifier of the target virtual pet on a blockchain system from the first obtaining request;

an obtaining module, configured to obtain first information of the target virtual pet from the blockchain system according to the pet identifier; and a transmission module, configured to transmit the first information to the terminal, the first information being used by the terminal to display a first display interface of the target virtual pet.

A terminal is provided, including a memory and a processor, the memory storing at least one computer-readable instruction, and the at least one computer-readable instruction being loaded and executed by the processor to implement the following operations:

determining a target virtual pet to be displayed in an application program;

obtaining first information of the target virtual pet from a server, the first information being stored on a blockchain system and corresponding to the target virtual pet; and displaying a first display interface associated with the target virtual pet, the first display interface including the first information of the target virtual pet.

A server is provided, including a memory and a processor, the memory storing at least one computer-readable instruction, and the at least one computer-readable instruction being loaded and executed by the processor to implement the following operations:

receiving a first obtaining request transmitted by a terminal, the first obtaining request being transmitted by the terminal after the terminal determines a target virtual pet to be displayed in an application program;

extracting a pet identifier of the target virtual pet on a blockchain system from the first obtaining request;

obtaining first information of the target virtual pet from the blockchain system according to the pet identifier; and transmitting the first information to the terminal, the first information being used by the terminal to display a first display interface of the target virtual pet.

A non-volatile computer-readable storage medium is provided, storing at least one computer-readable instruction, the at least one computer-readable instruction being loaded and executed by a processor to implement the following operations:

determining a target virtual pet to be displayed in an application program;

obtaining first information of the target virtual pet from a server, the first information being stored on a blockchain system and corresponding to the target virtual pet; and displaying a first display interface associated with the target virtual pet, the first display interface including the first information of the target virtual pet.

A non-volatile computer-readable storage medium is provided, storing at least one computer-readable instruction, the at least one computer-readable instruction being loaded and executed by a processor to implement the following operations:

receiving a first obtaining request transmitted by a terminal, the first obtaining request being transmitted by the terminal after the terminal determines a target virtual pet to be displayed in an application program;

extracting a pet identifier of the target virtual pet on a blockchain system from the first obtaining request;

obtaining first information of the target virtual pet from the blockchain system according to the pet identifier; and transmitting the first information to the terminal, the first information being used by the terminal to display a first display interface of the target virtual pet.

BRIEF DESCRIPTION OF THE DRAWINGS

The following briefly introduces the accompanying drawings for describing the embodiments. The accompanying drawings in the following description show merely example embodiments of the present invention, and a person of ordinary skill in the technology may derive other drawings from the accompanying drawings without creative efforts.

DESCRIPTION OF EMBODIMENTS

Figure 1:
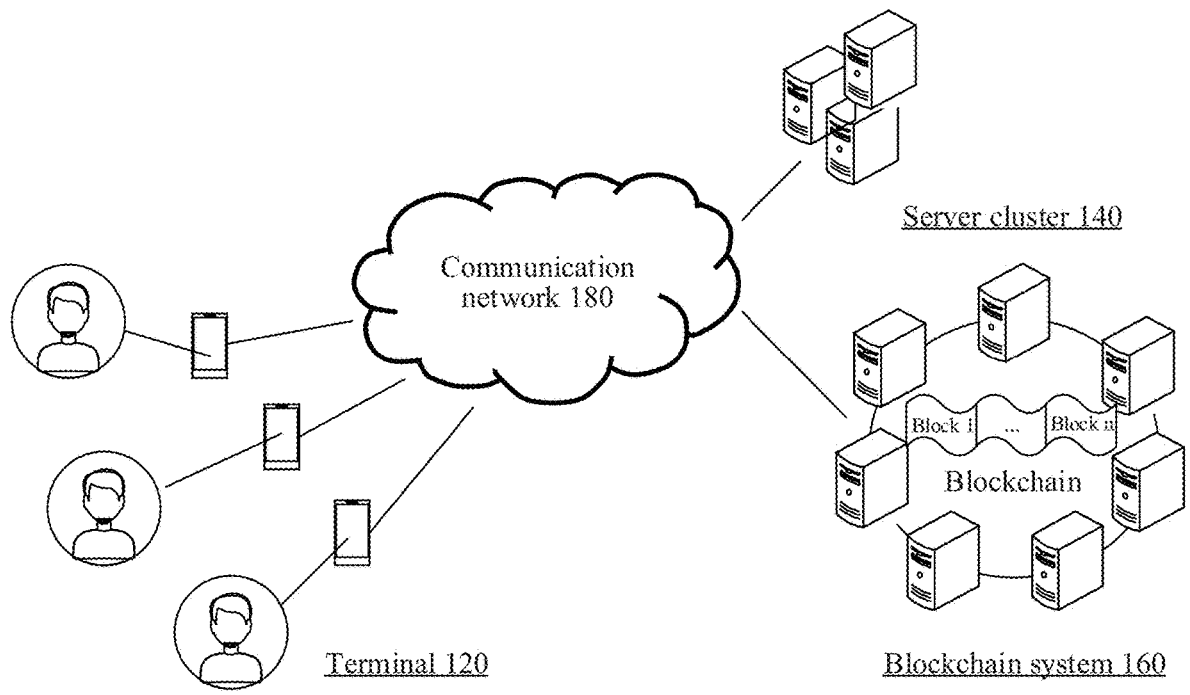
FIG. 1 shows a block diagram of an implementation environment of a method for displaying a virtual pet according to an exemplary embodiment of this disclosure.

To make objectives, technical solutions, and advantages of the embodiments of this application clearer, the following further describes in detail implementations of this application with reference to the accompanying drawings.

First, several terms involved in this application are explained.

A blockchain system refers to a system that stores data by using a blockchain technology. The blockchain technology is also referred to as a distributed ledger technology, which is an Internet database technology and features decentralization, openness and transparency, enabling all people to participate in database recording. The blockchain technology may be a distributed infrastructure and computing method that verifies and stores data by using a blockchain data structure, generates and updates data by using a distributed node consensus algorithm, ensures the security of data transmission and access by using a method of cryptology, and programs and operates data by using a smart contract formed by automation script code. The data stored in the blockchain system has very high stability and reliability, and the blockchain system is a database that cannot be tampered with and is reliable. Therefore, compared with storing the event journal information of the virtual pet conventionally by directly using a backend server of an application program, storing the event journal information of the virtual pet by using the blockchain system improves the security and reliability of the event journal information.

Block height: the quantity of blocks linked to a parent chain, that is, the quantity of blocks connected to a blockchain.

Virtual pet: a digital pet presented as a pet image in a cartoon form and/or an realistic animal form. The virtual pet may be a two-dimensional digital pet or a three-dimensional digital pet. For example, a virtual pet may be a three-dimensional virtual pet presented as a pet image in the form of a cartoon cat. Optionally, there are some virtual pets whose pet images are generated randomly. For example, pet images of the $0^{th}$-generation virtual pets are generated randomly. There are some virtual pets whose pet images are generated according to a genetic inheritance rule based on pet images of parental virtual pets and/or other ancestral virtual pets. For example, a pet image of a descendant virtual pet other than the $0^{th}$-generation virtual pet is generated according to the genetic inheritance rule. Optionally, each virtual pet has a unique gene sequence, and the gene sequence includes generation parameters for determining a pet image of the virtual pet. The gene sequence is also referred to as image parameters.

In some embodiments, pet information of each virtual pet is stored on a blockchain system, and is stored and authenticated through a consensus mechanism for a plurality of nodes on the blockchain system. The pet information at least includes: a unique gene sequence of the virtual pet, and further optionally includes: at least one of identification information of the virtual pet, parent information of the virtual pet, generation information of the virtual pet, genealogy information of the virtual pet, historical transaction journal information of the virtual pet, historical career event or life event information of the virtual pet and other information about the virtual pet. Because a gene sequence of each virtual pet is unique and information stored on a blockchain system is trustworthy and unique, a virtual pet has a collection attribute or value. Meanwhile, because pet information of a virtual pet is stored on a blockchain system, even if a virtual pet is a digital pet designed to be used in a first application program, the virtual pet can be conveniently migrated to a second application program and used. The first application program and the second application program may be different application programs.

In some embodiments, a virtual pet is a digital pet displayed by an application program running on a terminal. The application program includes at least one of the following functions: capturing a virtual pet, generating a virtual pet, breeding a virtual pet, trading a virtual pet, fighting by using a virtual pet, carrying out augmented reality (AR) interaction by using a virtual pet, carrying out social communication by using a virtual pet, and carrying out AR education by using a virtual pet. In some other embodiments, the application program may include the functions of obtaining, breeding and/or trading a virtual pet based on a blockchain system. In some other embodiments, the application program may be a geolocation-based social game program and the social game program provides at least one function of performing collection, growing, and/or fighting by using a virtual pet.

In some embodiments, the application program has a function of fighting by using a virtual pet. In this case, a gene sequence determines features of a virtual pet. The above-mentioned features may include: extrinsic features and/or intrinsic features.

Extrinsic features refer to features embodying a pet image of a virtual pet. Optionally, a virtual pet may include different body parts such as skin, speckles, ears, beards, patterns, eyes, and a mouth, and each of the body parts may have a variety of different extrinsic features. The extrinsic features may include visible features such as color, shape, texture and the like. For example, extrinsic features of skin may include different colors of white skin, red skin, orange skin, yellow skin, green skin, cyan skin, blue skin, purple skin and the like. In another example, extrinsic features of ears may include different shapes of long ears, short ears, rolled ears, folded ears, normal ears and the like.

Intrinsic features refer to features embodying intrinsic properties of a virtual pet. For example, intrinsic properties may include a variety of different properties such as an intelligence value, an attack power value, a defense power value, a dexterity value, a magic value, a strength value, an endurance value, an agility value, a potential value, a speed value, a health point and the like.

A gene sequence of a virtual pet: includes a set of parameter values used for generating a pet image of the virtual pet, and is also referred to as image parameters. Taking the virtual pet being a 3D virtual pet as an example, the pet image of each virtual pet includes a plurality of types of 3D image materials. The types of 3D image materials correspond to different role parts and/or texture levels. Each 3D image material corresponds to a material identifier. Each type of 3D material identifier can be considered as a parameter value in the gene sequence. For example, if 3D body models of a 3D virtual pet are the same, the pet image of the 3D virtual pet includes at least 8 types of 3D image materials (also referred to as local feature): 3D body model, ear model, skin material, eye material, nose material, mouth material, beard material, body speckle material, and chest and abdomen pattern material. Optionally, the pet image of the 3D virtual pet further optionally includes: tail material, external pendant material, and global feature. The tail material is a feature for determining a tail model of the virtual pet. For example, when the pet image is an animal type, the tail material includes a long and thin tail or a short and thick tail. The external pendant material is a feature for determining accessories of the virtual pet. The accessories include but are not limited to at least one of a backpack, glasses, handheld prop, belt, clothes, hat, shoes and head accessory. The global feature is an overall image feature for covering the body model of the virtual pet, and has the highest display priority. When target image parameters include the global feature, the global feature covers the local feature and is displayed with visual priority, that is, the local feature is hidden and not displayed. For example, when a pet cat has a superman global feature, a self image of the cat is not displayed, while a pet image with a superman appearance or a pet image with a robot appearance is displayed instead.

Correspondingly, the gene sequence includes at least one of a global feature parameter, a skin texture feature parameter, a skin color feature parameter, a belly texture feature parameter, a belly color feature parameter, an eye texture feature parameter, an eye color feature parameter, a mouth texture feature parameter, a mouth color feature parameter, a beard texture feature parameter, a beard color feature parameter, an ear feature parameter, a tail feature parameter, and a pendant feature parameter. The gene sequence can be represented by a plurality of key-value pairs arranged in order, and the key-value pairs can be in the form of (gene name, parameter value). In an exemplary implementation, the gene sequence is represented as Gene=[(3D body model feature, default), (skin feature, smooth), (belly feature, pattern 1), (mouth texture feature, small canine teeth 1), (mouth color feature, red), (tail feature, stubby shape)].

A genetic inheritance rule: also referred to as an inheritance rule, genetic algorithm, or genetic inheritance algorithm, is a rule of inheriting or passing down pet images of parental virtual pets and/or other ancestral virtual pets by imitating a genetic law of real creatures to generate a pet image of a filial virtual pet. In some embodiments, to ensure that each virtual pet is a unique customized virtual pet, each virtual pet has a unique gene sequence. In some embodiments, the genetic inheritance rule is a rule of recombining and deduplicating pet images of parental virtual pets and/or other ancestral virtual pets according to the genetic law to generate a pet image with a unique feature of a filial virtual pet. Deduplication refers to a mechanism of regenerating, when a same gene sequence as that of an existing virtual pet appears in a genetic process, a gene sequence of the virtual pet thereby ensuring genetic uniqueness of the virtual pet. Optionally, because the genetic inheritance rule imitates the genetic rule of real creatures, there are further restrictions in the breeding process, such as duration of pregnancy and forbidding breeding of close relatives.

In this embodiment of this disclosure, there are inherited genes between two virtual pets with a genetic relationship. Inherited genes refer to genes passed down from one of two virtual pets to the other. Features determined by inherited genes can be referred to as genetic features. Two virtual pets with a genetic relationship have same genetic features, that is, have same image material features. For example, two virtual pets with a genetic relationship both have yellow skin. In another example, two virtual pets with a genetic relationship both have red skin and folded ears. There may be one or more genetic features, which is not limited in this embodiment of this disclosure. Usually, the closer the generations between two virtual pets with a genetic relationship are, the more genetic features there are between the two virtual pets. Conversely, the further the generations between two virtual pets with a genetic relationship are, the fewer genetic features there are between the two virtual pets.

Generation information of a virtual pet: refers to generation information of the virtual pet in the entire virtual pet worldview, which is determined by generations of a paternal virtual pet and a maternal virtual pet of the virtual pet. In some embodiments, the generation of a filial virtual pet is obtained by adding one to the maximum generation number of the paternal virtual pet and the maternal virtual pet. For example, if the paternal virtual pet is a $0^r$-generation virtual pet and the maternal virtual pet is a $4^{th}$-generation virtual pet, the filial virtual pet is a $5^{th}$-generation virtual pet. In some embodiments, the generation of a zeroth-generation virtual pet is the lowest. For example, the generation of the zeroth-generation virtual pet is 0. The generation of a non-zeroth-generation virtual pet is determined by generations of the parental virtual pets thereof. The generation of the filial virtual pet bred and generated by the parental virtual pets is higher than those of the parental virtual pets thereof. In an example, if only parental virtual pets of a same generation are allowed to breed and generate a filial virtual pet (that is, next-generation virtual pet), the generation of the filial virtual pet is equal to the generation of the parental virtual pets plus 1. For example, if the generations of the parental virtual pets are both 1, the generation of the filial virtual pet is 2. In another example, if the generations of the parental virtual pets are both 0, the generation of the filial virtual pet is 1. In another example, if not only parental virtual pets of a same generation are allowed to breed and generate a filial virtual pet (that is, next-generation virtual pet), but also parental virtual pets of different generations are allowed to breed and generate a filial virtual pet, the generation of the filial virtual pet is equal to the generation of one of parental virtual pets with the higher generation plus 1. For example, when the generation of the paternal virtual pet is 0 and the generation of the maternal virtual pet is 2, the generation of the filial virtual pet is 3. In addition, the zeroth-generation virtual pet is not bred and generated by the paternal virtual pet and the maternal virtual pet, but is automatically generated by a virtual pet system. Therefore, the zeroth-generation virtual pet does not have a paternal virtual pet or a maternal virtual pet, and there are no other virtual pets that can both have higher generations than the zeroth-generation virtual pet and have a genetic relationship with the first-generation virtual pet.

FIG. 1 is a block diagram of an implementation environment of a method for displaying a virtual pet according to an exemplary embodiment of this disclosure. The implementation environment includes: a terminal 120, a server cluster 140, a blockchain system 160, and a communication network 180.

The terminal 120 is connected to the server cluster 140 through the communication network 180. The terminal 120 may be at least one of a smartphone, a game console, a desktop computer, a tablet computer, an e-book reader, a Moving Picture Experts Group Audio Layer III (MP3) player, a Moving Picture Experts Group Layer IV (MP4) player, or a laptop portable computer. An application program supporting a virtual pet is installed and run on the terminal 120. The application program may be any one of a pet breeding game program, an Augmented Reality (AR) game program, and an AR education program. A user account may be used for a user to log in to the application program in the terminal 120.

The server cluster 140 includes at least one of a single server, a plurality of servers, a cloud computing platform or a virtualization center. The server cluster 140 is configured to provide a backend service for the application program supporting a virtual pet. Optionally, the server cluster 140 may be responsible for primary computing work, and the terminal 120 may be responsible for secondary computing work; or the server cluster 140 may be responsible for secondary computing work, and the terminal 120 may be responsible for primary computing work; or the server cluster 140 and the terminal 120 may perform collaborative computing by using a distributed computing architecture between each other.

Optionally, the server cluster 140 may include: an access server and a backend server. The access server may be configured to provide an access service and an information receiving/transmitting service for the terminal 120, and forward valid information between the terminal 120 and the backend server. The backend server may be configured to provide the backend service for the application program, such as, at least one of a game logic service, a material providing service, a virtual pet generating service, a three-dimensional image generating service of a virtual pet, a two-dimensional image conversion and storage service of a virtual pet, a virtual pet trading service, and a virtual pet display service. There may be one or more backend servers. When there are a plurality of backend servers, there may be at least two backend servers configured to provide different services, and/or there may be at least two backend servers configured to provide the same service. This is not limited in this embodiment of this disclosure.

The blockchain system 160 is connected to the server cluster 140 through the communication network 180. The server cluster 140 stores role information and/or a trading record of each virtual pet in the blockchain system 160. In a case that the terminal 120 obtains the role information and/or the trading record of the virtual pet, the server cluster 140 pulls target information from the blockchain system 160 and feeds the target information back to the terminal 120.

In some optional embodiments, the server cluster 140 itself may alternatively be used as one or more nodes in the blockchain system 160 to process and store data.

The communication network 180 may be a wired network and/or a wireless network, the wired network may be a metropolitan area network, a local area network, a fiber optic network or the like, and the wireless network may be a mobile communication network or a Wireless Fidelity (Wi-Fi) network.

Figure 2:
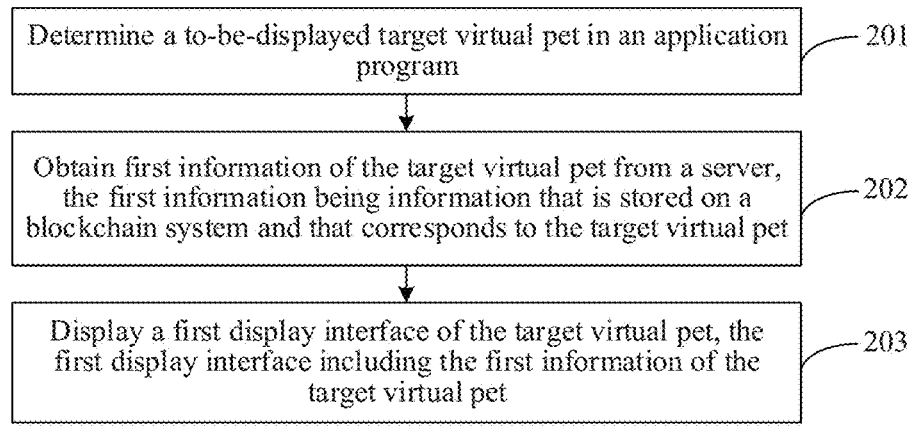
FIG. 2 shows a flowchart of a method for displaying a virtual pet according to an exemplary embodiment of this disclosure.

FIG. 2 is a flowchart of a method for displaying a virtual pet according to an exemplary embodiment of this disclosure. This embodiment is described by using an example in which the method is applied to the terminal 120 in the implementation environment shown in FIG. 1. The method includes the following steps:

Step 201. Determine a to-be-displayed target virtual pet in an application program.

The application program is run on the terminal, and the terminal logs in to the application program through a user account. The application program can provide a virtual pet. For example, the application program may be any one of a pet breeding game program, an AR game program, and an AR education program.

The virtual pet may be a digital pet owned, bred or collected by the user account. The virtual pet is a character used for being displayed in the application program in the terminal. The virtual pet is any one of a two-dimensional virtual pet, a 2.5-dimensional virtual pet and a three-dimensional virtual pet. Optionally, the virtual pet has a character image in an animal form and/or a cartoon form.

Determining, by the terminal, a to-be-displayed target virtual pet in the application program may include:

obtaining, by the terminal, pet information of m virtual pets from a server, where the pet information of the m virtual pets include summary information that is stored on a blockchain system for the m virtual pets owned by a current user account, and m is a positive integer; displaying a pet preview interface in the application program, where the pet preview interface is used for displaying the pet information of the m virtual pets owned by the current user account; receiving a selection signal triggered on the pet preview interface; and determining the target virtual pet in the m virtual pets according to the selection signal.

Step 202. Obtain first information of the target virtual pet from a server, the first information being information that is stored on a blockchain system and that corresponds to the target virtual pet.

Obtaining, by the terminal, the first information of the target virtual pet from a server may include:

transmitting, by the terminal, a first obtaining request to the server, the first obtaining request including a pet identifier of the target virtual pet on the blockchain system; and receiving the first information fed back by the server, the first information being obtained by the server from the blockchain system according to the pet identifier, where information corresponding to the target virtual pet is stored on the blockchain system.

The first information includes at least one of the following information: a three-dimensional character image of the target virtual pet, generation information of the target virtual pet, a name of the target virtual pet, an identifier of the target virtual pet, image characteristic information of the target virtual pet, or a breeding recovery time of the target virtual pet. Optionally, the first information may further include information about parental virtual pets of the target virtual pet.

Step 203. Display a first display interface of the target virtual pet, the first display interface including the first information of the target virtual pet.

The terminal generates the first display interface through rendering according to the first information of the target virtual pet, where the first display interface includes the first information.

Optionally, displaying, by the terminal, the first display interface of the target virtual pet may further include:

receiving, by the terminal, a first slide signal on the first display interface; sliding displayed content on the first display interface to a first direction according to the first slide signal; and displaying, in a case of sliding to a first location on the first display interface, the information about the parental virtual pets in displayed content corresponding to the first location. The information about the parental virtual pets includes two-dimensional character images of the parental virtual pets, generation information of the parental virtual pets, and names of the parental virtual pets.

Optionally, the slide signal is generated through triggering of a slide gesture on a touch screen; and the first direction may be a direction parallel to an up-down direction and/or a left-right direction of a portrait display mode of the terminal.

Optionally, displaying the information about the parental virtual pets in the displayed content corresponding to the first location includes:

displaying a paternal character field and a maternal character field on the first location, where a paternal virtual pet corresponding to the target virtual pet is displayed on the paternal character field, and a maternal virtual pet corresponding to the target virtual pet is displayed on the maternal character field.

Optionally, the first display interface is further used for displaying information about a filial virtual pet of the target virtual pet. The information about the filial virtual pet includes a two-dimensional character image of the filial virtual pet, generation information of the filial virtual pet, and a name of the filial virtual pet. The displaying, by the terminal, information about a filial virtual pet of the target virtual pet on the first display interface includes:

receiving, by the terminal, a second slide signal on the first display interface; sliding displayed content on the first display interface to a first direction according to the second slide signal; obtaining second information of the target virtual pet from the server in a case of sliding to a second location on the first display interface, where the second information is information that is stored on the blockchain system and that is about the filial virtual pet corresponding to the target virtual pet; and displaying the information about the filial virtual pet in displayed content corresponding to the second location.

Optionally, the displaying the information about the filial virtual pet in displayed content corresponding to the second location includes:

displaying at least one filial character field in the displayed content corresponding to the second location, where the filial virtual pet corresponding to the target virtual pet is displayed on each filial character field.

Optionally, the obtaining information about a filial virtual pet of the target virtual pet from the server in a case of sliding to a second location on the first display interface includes:

transmitting a second obtaining request to the server in the case of sliding to the second location on the first display interface, the second obtaining request including a pet identifier of the target virtual pet on the blockchain system; and receiving the second information fed back by the server, the second information being obtained by the server from the blockchain system according to the pet identifier.

Optionally, the first display interface is further used for displaying genealogy information of the target virtual pet, where the genealogy information includes two-dimensional character images of grandparental virtual pets of the target virtual pet, generation information of the grandparental virtual pets, and names of the grandparental virtual pets. The displaying, by the terminal, genealogy information of the target virtual pet on the first display interface includes:

receiving a third slide signal on the first display interface; sliding displayed content on the first display interface to a first direction according to the third slide signal; obtaining third information of the target virtual pet from the server in a case of sliding to a third location on the first display interface, where the third information is genealogy information that is stored on the blockchain system and that corresponds to the target virtual pet; and displaying the genealogy information of the target virtual pet in displayed content corresponding to the third location.

Optionally, the foregoing third location is used for indicating a character field for displaying the genealogy information.

To summarize, in the method for displaying a virtual pet provided in this embodiment, the terminal communicates with the blockchain system through the server, obtains the first information corresponding to the target virtual pet stored on the blockchain system, and displays the first display interface according to the first information. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface.

Based on the embodiment shown in FIG. 2, the method for displaying a virtual pet provided in this application includes displaying a first display interface. A process of displaying a first display interface in a method for displaying a virtual pet is described in detail in exemplary embodiments shown in FIG. 3, FIG. 6, FIG. 8 and FIG. 10.

Figure 3:
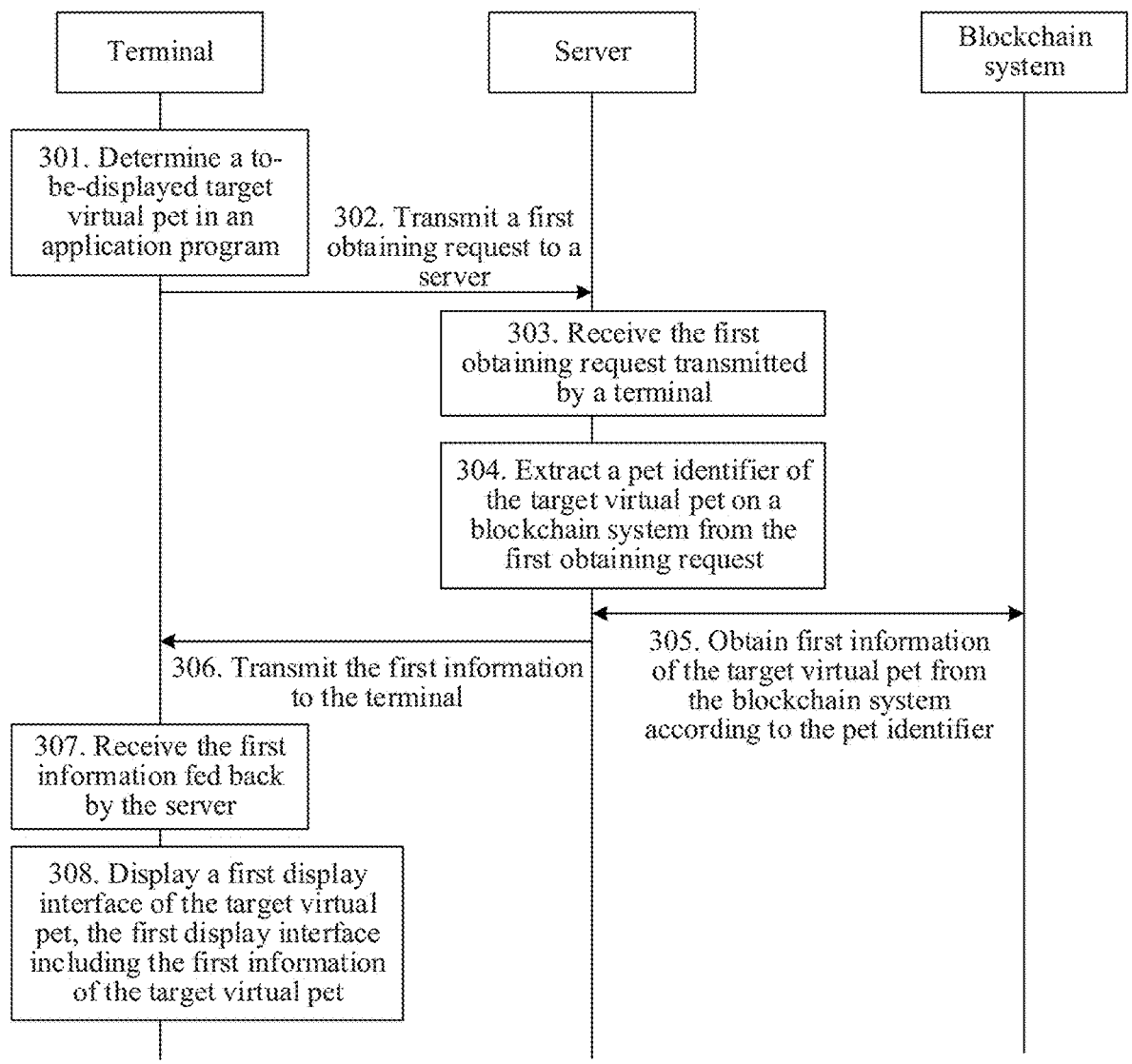
FIG. 3 shows a flowchart of a method for displaying a virtual pet according to another exemplary embodiment of this disclosure.

FIG. 3 is a flowchart of a method for displaying a virtual pet according to another exemplary embodiment of this disclosure. This embodiment is described by using an example in which the method is applied to the implementation environment shown in FIG. 1. The method includes the following steps:

Step 301. A terminal determines a to-be-displayed target virtual pet in an application program.

The application program is run on the terminal, and the terminal logs in to the application program through a user account. The application program can provide a virtual pet. Optionally, the application program may be any one of a pet breeding game program, an AR game program, and an AR education program.

The virtual pet is a digital pet owned, bred or collected by the user account. The virtual pet is a character used for being displayed in the application program in the terminal. The virtual pet is any one of a two-dimensional virtual pet, a 2.5-dimensional virtual pet and a three-dimensional virtual pet. Optionally, the virtual pet has a character image in an animal form and/or a cartoon form.

Determining, by the terminal, a to-be-displayed target virtual pet in the application program may include:

obtaining, by the terminal, pet information of m virtual pets from a server, where the pet information of the m virtual pets includes summary information that is stored on a blockchain system of the m virtual pets owned by a current user account, and m is a positive integer; displaying a pet preview interface in the application program, where the pet preview interface is used for displaying the pet information of the m virtual pets owned by the current user account; receiving a selection signal triggered on the pet preview interface; and determining the target virtual pet in the m virtual pets according to the selection signal.

Step 302. The terminal transmits a first obtaining request to the server.

The terminal transmits the first obtaining request to the server through a wireless network or a wired network. The first obtaining request includes a pet identifier of the target virtual pet, and is used for requesting to obtain corresponding information of the target virtual pet on the blockchain system from the server.

Step 303. The server receives the first obtaining request transmitted by the terminal.

Step 304. The server extracts the pet identifier of the target virtual pet on the blockchain system from the first obtaining request.

Extracting, by the server, a pet identifier of the target virtual pet on a blockchain system from the first obtaining request includes:

obtaining, by the server after receiving the first obtaining request transmitted by the terminal, identity (ID) information of the target virtual pet from the first obtaining request, where the ID information can be identified and responded to by the blockchain system.

Step 305. The server obtains first information of the target virtual pet from the blockchain system according to the pet identifier.

The server transmits the ID information of the target virtual pet to the blockchain system; the blockchain system detects the ID information through a consensus algorithm, determines that the target virtual pet corresponding to the ID information exists, and feeds the first information corresponding to the target virtual pet back to the server; and the server receives the first information fed back by the blockchain system.

The first information of the target virtual pet may include: at least one of a three-dimensional character image of the target virtual pet, generation information of the target virtual pet, a name of the target virtual pet, an identifier of the target virtual pet, image characteristic information of the target virtual pet, and a breeding recovery time of the target virtual pet. Optionally, the first information further includes information about parental virtual pets of the target virtual pet.

Step 306. The server transmits the first information to the terminal.

The server transmits the first information to the terminal through a wired network or a wireless network.

Step 307. The terminal receives the first information fed back by the server.

Step 308. The terminal displays a first display interface of the target virtual pet, the first display interface including the first information of the target virtual pet.

The terminal may generate the first display interface through rendering according to the first information of the target virtual pet, where the first display interface includes the first information.

Optionally, displaying, by the terminal, the first display interface of the target virtual pet further may include:

receiving, by the terminal, a first slide signal on the first display interface; sliding displayed content on the first display interface to a first direction according to the first slide signal; and displaying, in a case of sliding to a first location on the first display interface, the information about the parental virtual pets in displayed content corresponding to the first location. The information about the parental virtual pets includes two-dimensional character images of the parental virtual pets, generation information of the parental virtual pets, and names of the parental virtual pets.

Optionally, the slide signal is generated through triggering of a slide gesture on a touch screen; and the first direction may be a direction parallel to an up-down direction and/or a left-right direction of a portrait mode.

Optionally, displaying the information about the parental virtual pets in displayed content corresponding to the first location includes:

displaying a paternal character field and a maternal character field on the first location, where a paternal virtual pet corresponding to the target virtual pet is displayed on the paternal character field, and a maternal virtual pet corresponding to the target virtual pet is displayed on the maternal character field.

Optionally, the first display interface is further used for displaying information about a filial virtual pet of the target virtual pet. The information about the filial virtual pet may include a two-dimensional character image of the filial virtual pet, generation information of the filial virtual pet, and/or a name of the filial virtual pet. Displaying, by the terminal, information about the filial virtual pet of the target virtual pet on the first display interface may include:

receiving, by the terminal, a second slide signal on the first display interface; sliding displayed content on the first display interface to a first direction according to the second slide signal; obtaining second information of the target virtual pet from the server in a case of sliding to a second location on the first display interface, where the second information is stored on the blockchain system about the filial virtual pet corresponding to the target virtual pet; and displaying the information about the filial virtual pet in displayed content corresponding to the second location.

Optionally, displaying the information about the filial virtual pet in displayed content corresponding to the second location may include:

displaying at least one filial character field in the displayed content corresponding to the second location, where the filial virtual pet corresponding to the target virtual pet is displayed on each filial character field.

Optionally, obtaining information about a filial virtual pet of the target virtual pet from the server in the case of sliding to the second location on the first display interface includes:

transmitting a second obtaining request to the server in the case of sliding to the second location on the first display interface, the second obtaining request including a pet identifier of the target virtual pet on the blockchain system; and receiving the second information fed back by the server, the second information being obtained by the server from the blockchain system according to the pet identifier.

Optionally, the first display interface is further used for displaying genealogy information of the target virtual pet, where the genealogy information includes two-dimensional character images of grandparental virtual pets of the target virtual pet, generation information of the grandparental virtual pets, and names of the grandparental virtual pets. Displaying, by the terminal, genealogy information of the target virtual pet on the first display interface may include:

receiving a third slide signal on the first display interface; sliding displayed content on the first display interface to a first direction according to the third slide signal; obtaining third information of the target virtual pet from the server in a case of sliding to a third location on the first display interface, where the third information is genealogy information that is stored on the blockchain system and that corresponds to the target virtual pet; and displaying the genealogy information of the target virtual pet in displayed content corresponding to the third location.

Optionally, the foregoing third location is used for indicating a character field for displaying the genealogy information.

Figure 4:
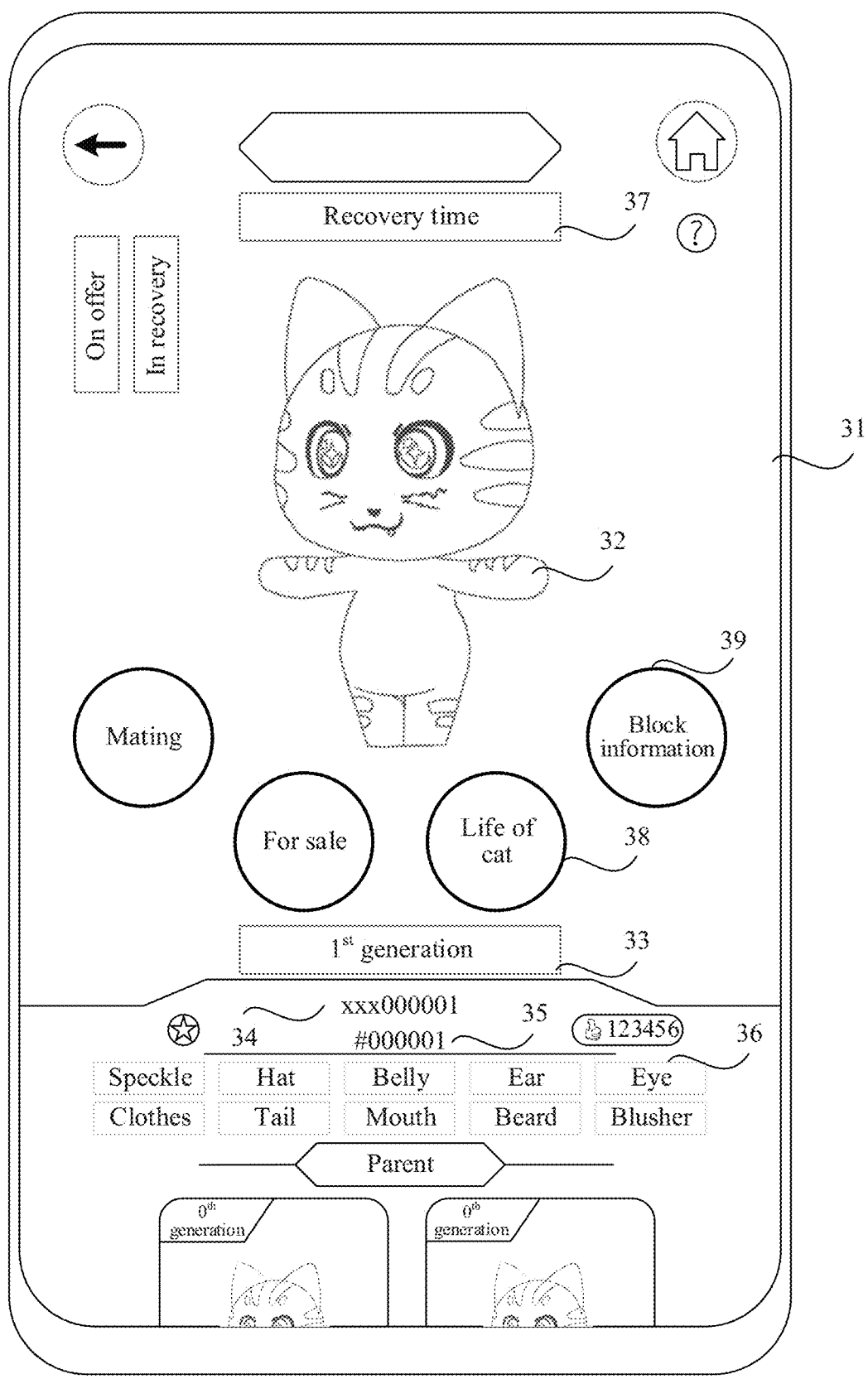
FIG. 4 shows a schematic diagram of an interface for displaying a virtual pet according to an exemplary embodiment of this disclosure.

As an example, FIG. 4 shows a schematic diagram of a first display interface displayed in a process of implementing a method for displaying a virtual pet. Taking an example in which a virtual pet is a pet cat, the terminal determines, in an application program, that a to-be-displayed target virtual pet is a pet cat 32, transmits a first obtaining request to a server, and requests to obtain first information of the pet cat 32; the server obtains, after receiving the first obtaining request transmitted by the terminal, ID information of the pet cat 32 from the first obtaining request, and obtains the first information of the pet cat 32 from a blockchain system according to the ID information of the pet cat 32; and the terminal generates a first display interface 31 through rendering according to the first information of the pet cat 32, and displays the first display interface 31.

A three-dimensional image of the pet cat 32, generation information 33 of the pet cat 32, a name 34 of the pet cat 32, an identifier 35 of the pet cat 32, image characteristic information 36 of the pet cat 32, and a breeding recovery time 37 of the pet cat 32 are displayed on the first display interface 31. Schematically, the three-dimensional image of the pet cat 32 may include image factors such as ears, skin, speckles, patterns, eyes, a mouth and beards; and some actions such as hand waving, sitting down, and smiling may be further displayed by tapping the three-dimensional image of the pet cat 32. The display form of the generation information 33 may be "$i^{th}$-generation", where i is an integer greater than or equal to 0, representing generation information of the pet cat 32 in the entire virtual pet worldview. FIG. 4 displays "$1^{st}$-generation", representing that the pet cat 32 is a first-generation pet cat in the entire virtual pet worldview. Generation information of a virtual pet is determined by generations of a paternal virtual pet and a maternal virtual pet of the virtual pet. In some embodiments, a generation of a filial virtual pet is obtained by adding one to the maximum generation number of a paternal virtual pet and a maternal virtual pet. For example, if the paternal virtual pet is a $0^{th}$-generation virtual pet, and the maternal virtual pet is a $4^{th}$-generation virtual pet, the filial virtual pet is a $5^{th}$-generation virtual pet. The form of the name 34 may be "xxx123456"; and when one pet cat is generated, the system randomly extracts three characters, and tags each pet cat with one 6-digit serial number, and the characters and the serial number are combined to obtain the name of the pet cat. For example, when the pet cat 32 was born, three characters extracted by the system is "xxx", the system finds, through comparison, all pet cats whose characters are the same as the three characters "xxx", a 6-digit serial number "000001" is obtained by adding 1 to the maximum serial number of all the foregoing pet cats, and "xxx" and "000001" are combined to obtain the name of the pet cat 32 being "xxx000001". The display form of the identifier 35 may be "#123456", and the identifier 35 is an identifier of the pet cat 32 stored on the blockchain. For example, the identifier of the pet cat 32 is "#000001". The image characteristic information 36 may include: at least one of speckles, a hat, a belly, ears, eyes, clothes, a tail, a mouth, beards, and blusher. For example, the image characteristic information in FIG. 4 represents exclusive characteristics of the pet cat 32, including its dressing-up and pendant. The breeding recovery time 37 refers to a duration in which the breeding capability is recovered after the pet cat 32 completes breeding once. For example, if the breeding recovery time of the pet cat 32 is 12 hours, the pet cat 32 can breed again only after at least 12 hours after completing a previous breeding.

In some embodiments, the first display interface further may include: a back button, configured to return the application to a previous display interface; a Home button, configured to go back to a main interface of the terminal; a collection button, configured to collect a pet cat; a like button, configured to give a like to a pet cat; a status bar, configured to display status information of a pet cat; a player information display bar, configured to display player information; and a description button, configured to display a playing method of an exclusive cat. Schematically, on the first display interface 31, a detailed interface of the pet cat 32 may exit through the back button on the top left side of the interface. Returning to a main interface of a game may be directly performed through the Home button on the top right side of the interface (e.g., if the pet preview interface is defined as the main interface, returning to the pet preview interface may be directly performed by tapping the Home button); the pet cat 32 may be collected to a favorites folder through the collection button on the left side of the name 34; a like may be given to the pet cat 32 through the like button on the right side of the name 34; the status bar may display status information of the pet cat 32, such as "in breeding", "on offer", "in recovery", or "in mating"; player information such as an avatar of a player and a nickname of the player may be displayed above the breeding recovery time 37, and in a case that the pet cat 32 is owned by the player, the player information display bar does not display any information; and a playing method of the pet cat 32 is displayed by tapping the description button.

Figure 5:
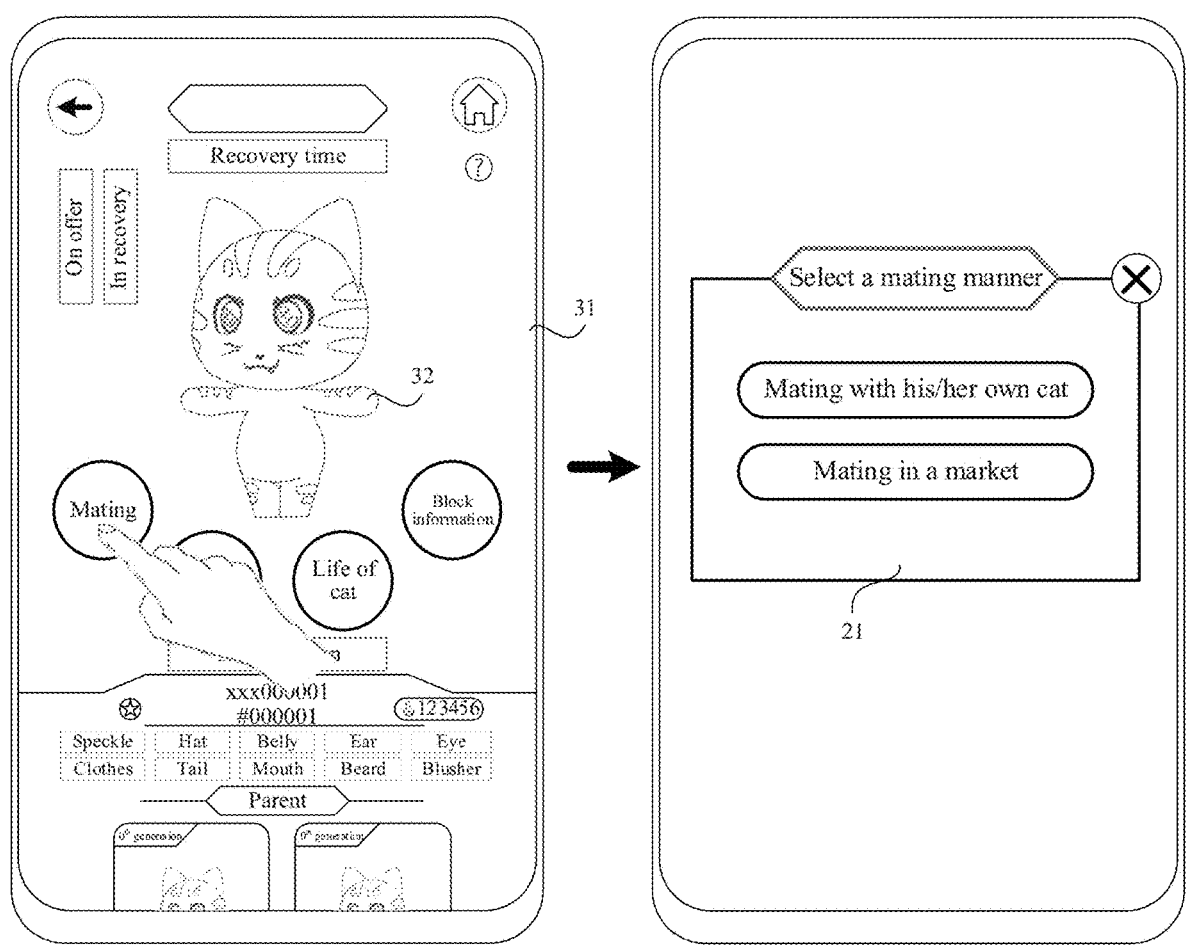
FIG. 5 is a schematic diagram of a display interface switching for displaying information of a virtual pet according to another exemplary embodiment of this disclosure.

In some embodiments, the first display interface further includes a mating button. When clicked, the mating button is configured to perform a breeding behavior between virtual pets. Referring to FIG. 5, taking an example in which a virtual pet is a pet cat, a first display interface 31 of a pet cat 32 includes a mating button. As shown in a left diagram in FIG. 5, if the mating button is tapped, the terminal displays a mating selection interface 21. As shown in a right diagram in FIG. 5, the mating selection interface 21 displays pet cat mating manners: mating with his/her own cat and mating in a market. A mating manner is mating with another pet cat under the same account, and another mating manner is mating with a pet cat to be selected in a market.

In some embodiments, the first display interface further includes a selling button. The selling button is configured to release a pet cat to a market for selling, and the market is a platform configured to trade a pet cat.

To summarize, the terminal communicates with the blockchain system through the server, obtains the first information corresponding to the target virtual pet stored on the blockchain system, and displays the first display interface according to the first information. Because information stored in the blockchain system is confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface. The first display interface displays detail information of the target virtual pet, and vividly displays an appearance characteristic of the target virtual pet by displaying the three-dimensional character image of the target virtual pet.

Figure 6:
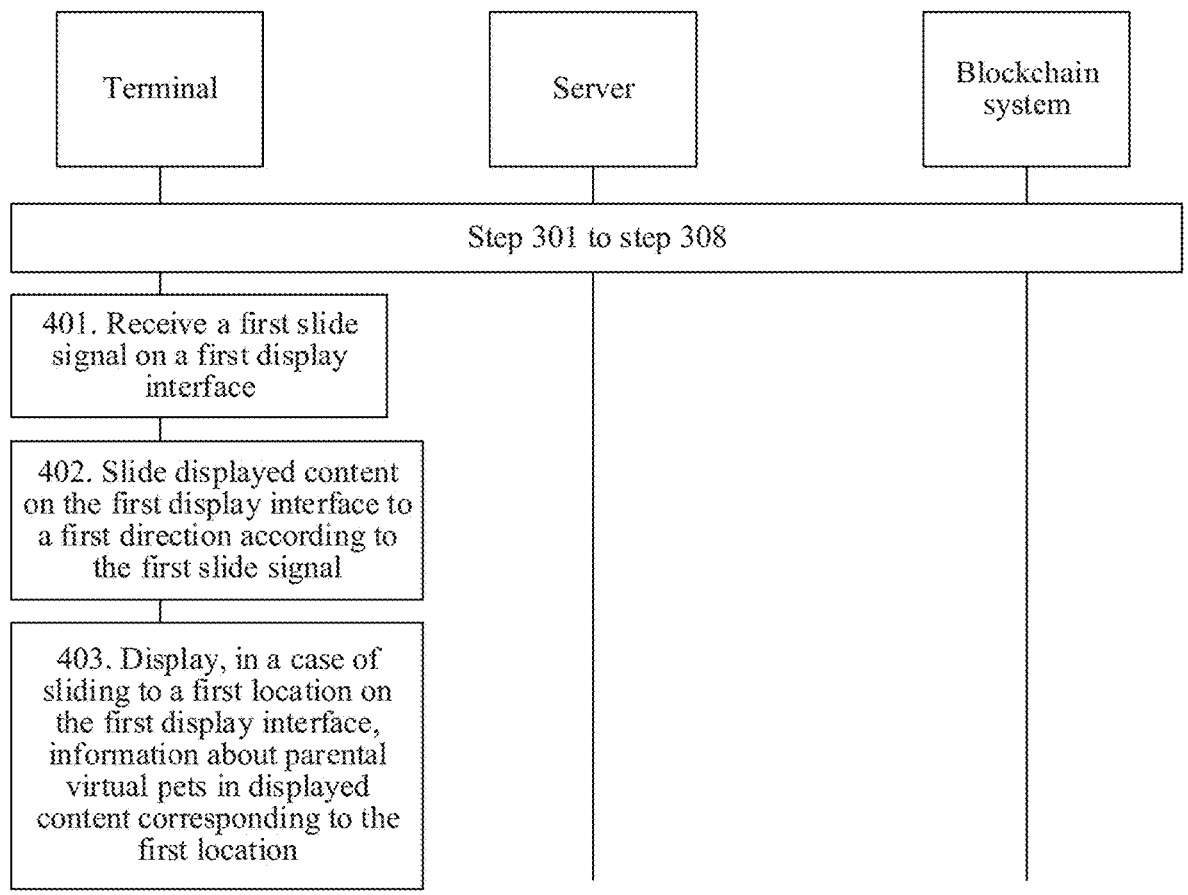
FIG. 6 is a flowchart of a method for displaying a virtual pet according to another exemplary embodiment of this disclosure.

FIG. 6 is a flowchart of a method for displaying a virtual pet according to another exemplary embodiment of this disclosure. This embodiment is described by using an example in which the method is applied to the implementation environment shown in FIG. 1. The first display interface of the target virtual pet further includes information about the parental virtual pets of the target virtual pet. Based on step 301 to step 308 shown in FIG. 3, step 401 to step 403 are added, to display the first display interface of the target virtual pet. Specific steps are shown as follows:

Step 401. The terminal receives a first slide signal on the first display interface.

The terminal receives the first slide signal on the first display interface, and the first slide signal is a triggering signal generated by a slide gesture occurring on a touch screen. In a case that the terminal displays the first display interface, a slide gesture occurs on the touch screen of the terminal, and the slide gesture delivers a triggering signal, that is, a first triggering signal to the terminal through the touch screen.

Step 402. The terminal slides displayed content on the first display interface to a first direction according to the first slide signal.

The terminal slides the displayed content on the first display interface to the first direction according to the first slide signal, hides a part of the displayed content slid to the first direction, and displays content not displayed before sliding to a direction opposite to the first direction. Optionally, the first direction may be a direction parallel to an up-down direction and/or a left-right direction of a portrait mode. Optionally, the displayed content includes information about the target virtual pet.

Step 403. The terminal displays, in a case of sliding to a first location on the first display interface, the information about the parental virtual pets in displayed content corresponding to the first location.

A paternal character field and a maternal character field are displayed on the first location. The first information includes information about parental virtual pets of the target virtual pet. In a case of sliding to the first location on the first display interface, information about a paternal virtual pet corresponding to the target virtual pet is displayed on the paternal character field and information about a maternal virtual pet corresponding to the target virtual pet is displayed on the maternal character field according to the first information. The information about the parental virtual pets includes at least one of two-dimensional character images of the parental virtual pets, generation information of the parental virtual pets, and names of the parental virtual pets.

Figure 7:
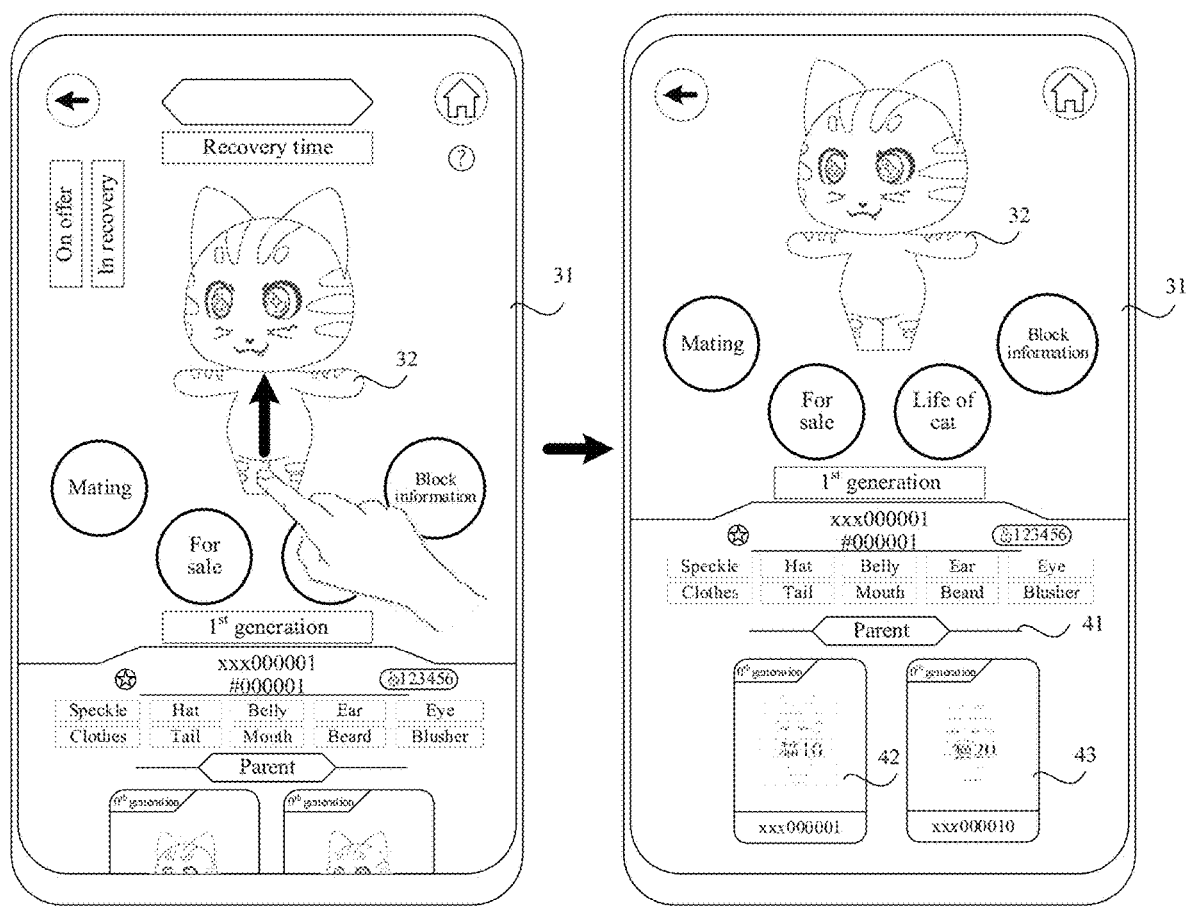
FIG. 7 is a schematic diagram of a display interface switching for displaying information of a virtual pet according to another exemplary embodiment of this disclosure.

Referring to FIG. 7, a terminal displays a first display interface 31, and displayed content on the first display interface 31 is slid upward through a slide gesture. As shown in a left diagram in FIG. 7, in a slide process, the displayed content on the first display interface 31 is partially hidden. In a case of sliding to a first location 41 on the first display interface 31, the terminal displays a paternal pet cat on a paternal character field 42 (43), and displays a maternal pet cat on a maternal character field 43 (42), as shown in a right diagram in FIG. 7. The information about the parental virtual pets is displayed in a card form, the paternal character field 42 (43) displays a two-dimensional image picture, genera-tion information, and a name of the paternal pet cat, and the maternal character field 43 (42) displays a two-dimensional image picture, generation information, and a name of the maternal pet cat.

To summarize, the terminal communicates with the blockchain system through the server, obtains the first information corresponding to the target virtual pet stored on the blockchain system, and displays the first display interface according to the first information. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface.

Figure 8:
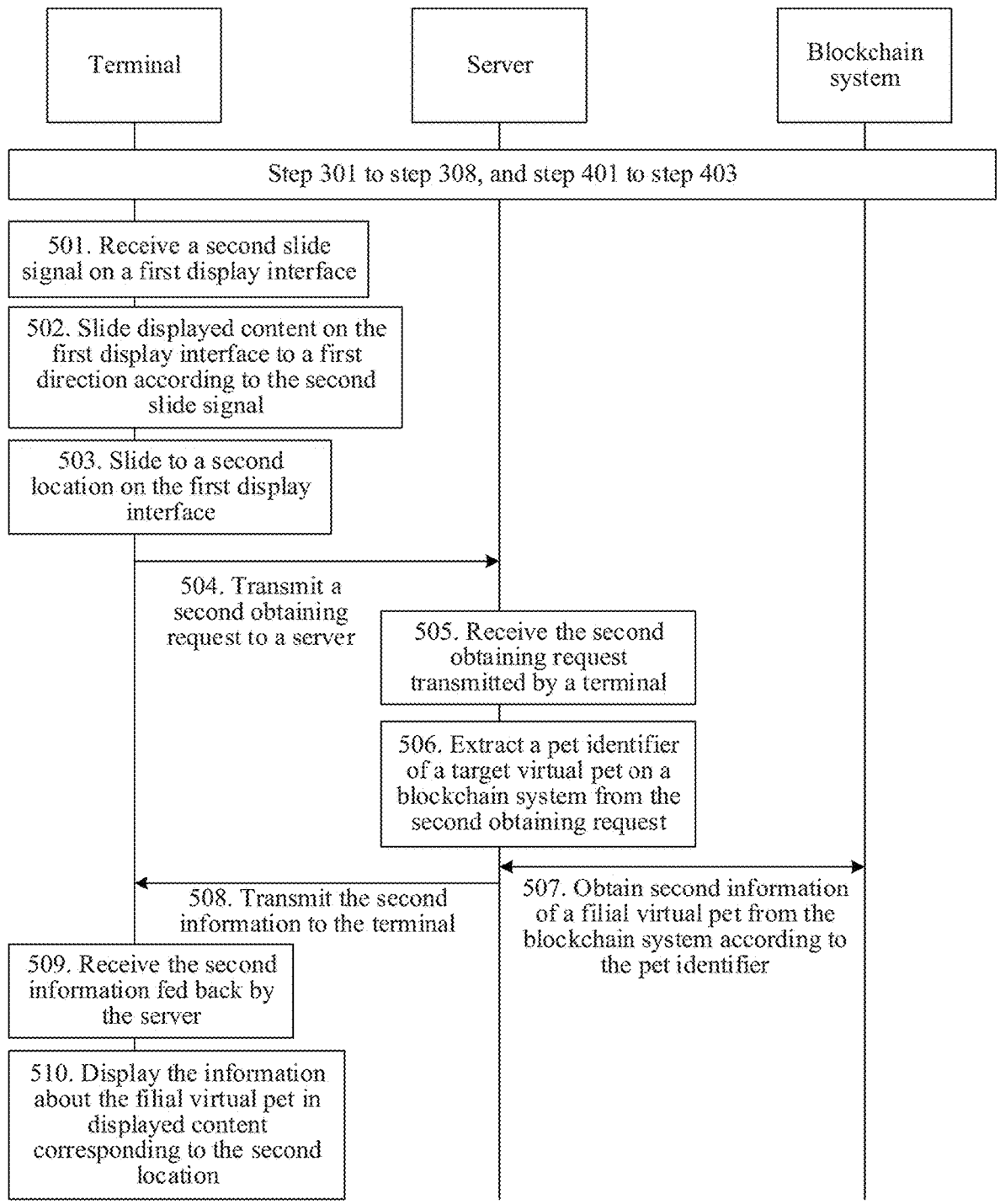
FIG. 8 is a flowchart of a method for displaying a virtual pet according to another exemplary embodiment of this disclosure.

FIG. 8 is a flowchart of a method for displaying a virtual pet according to another exemplary embodiment of this disclosure. This embodiment is described by using an example in which the method is applied to the implementation environment shown in FIG. 1. After displaying information about parental virtual pets, a first display interface is further used for displaying information about a filial virtual pet of a target virtual pet. Based on the embodiment shown in FIG. 6, step 501 to step 510 are added after steps 401 to 403, to display the first display interface of the target virtual pet. Specific steps are shown as follows:

Step 501. A terminal receives a second slide signal on the first display interface.

The terminal receives the second slide signal on the first display interface, and the second slide signal is a triggering signal generated by a slide gesture occurring on a touch screen. After the information about the parental virtual pets of the target virtual pet is displayed on the first display interface, a slide gesture occurs on the touch screen of the terminal, and the slide gesture delivers a triggering signal, that is, a second triggering signal to the terminal through the touch screen.

Step 502. The terminal slides displayed content on the first display interface to a first direction according to the second slide signal.

The terminal slides the displayed content on the first display interface to the first direction according to the second slide signal, hides a part of the displayed content slid to the first direction, and displays content not displayed before sliding to a direction opposite to the first direction. Optionally, the first direction may be a direction parallel to an up-down direction and/or a left-right direction of a portrait mode. Optionally, the displayed content includes: at least one of the information about the parental virtual pets, and a combination of the information about the target virtual pet and the information about the parental virtual pets.

Step 503. Slide to a second location on the first display interface.

Sliding to the second location on the first display interface is performed. At least one filial character field is displayed on the second location, and used for displaying the information about the filial virtual pet corresponding to the target virtual pet. The information about the filial virtual pet includes at least one of a two-dimensional character image of the filial virtual pet, generation information of the filial virtual pet, and a name of the filial virtual pet.

Step 504. The terminal transmits a second obtaining request to the server.

The terminal transmits the second obtaining request to the server through a wireless network or a wired network. The second obtaining request includes a pet identifier of the target virtual pet, and is used for requesting to obtain the information about the filial virtual pet corresponding to the target virtual pet on the blockchain system from the server.

Step 505. The server receives the second obtaining request transmitted by the terminal.

Step 506. The server extracts the pet identifier of the target virtual pet on the blockchain system from the second obtaining request.

The server obtains, after receiving the second obtaining request transmitted by the terminal, ID information of the target virtual pet from the second obtaining request, where the ID information can be identified and responded to by the blockchain system.

Step 507. The server obtains second information of the filial virtual pet from the blockchain system according to the pet identifier.

The server transmits the ID information of the target virtual pet to the blockchain system; the blockchain system obtains the second information corresponding to the target virtual pet according to the ID information of the target virtual pet, and feeds the second information back to the server; the server receives the second information fed back by the blockchain system. The second information of the target virtual pet includes the information about the filial virtual pet.

Step 508. The server transmits the second information to the terminal.

Step 509. The terminal receives the second information fed back by the server.

Step 510. The terminal displays the information about the filial virtual pet in displayed content corresponding to the second location.

In a case of sliding to the second location on the first display interface, the information about the filial virtual pet corresponding to the target virtual pet is displayed on at least one filial character field according to the second information.

Figure 9:
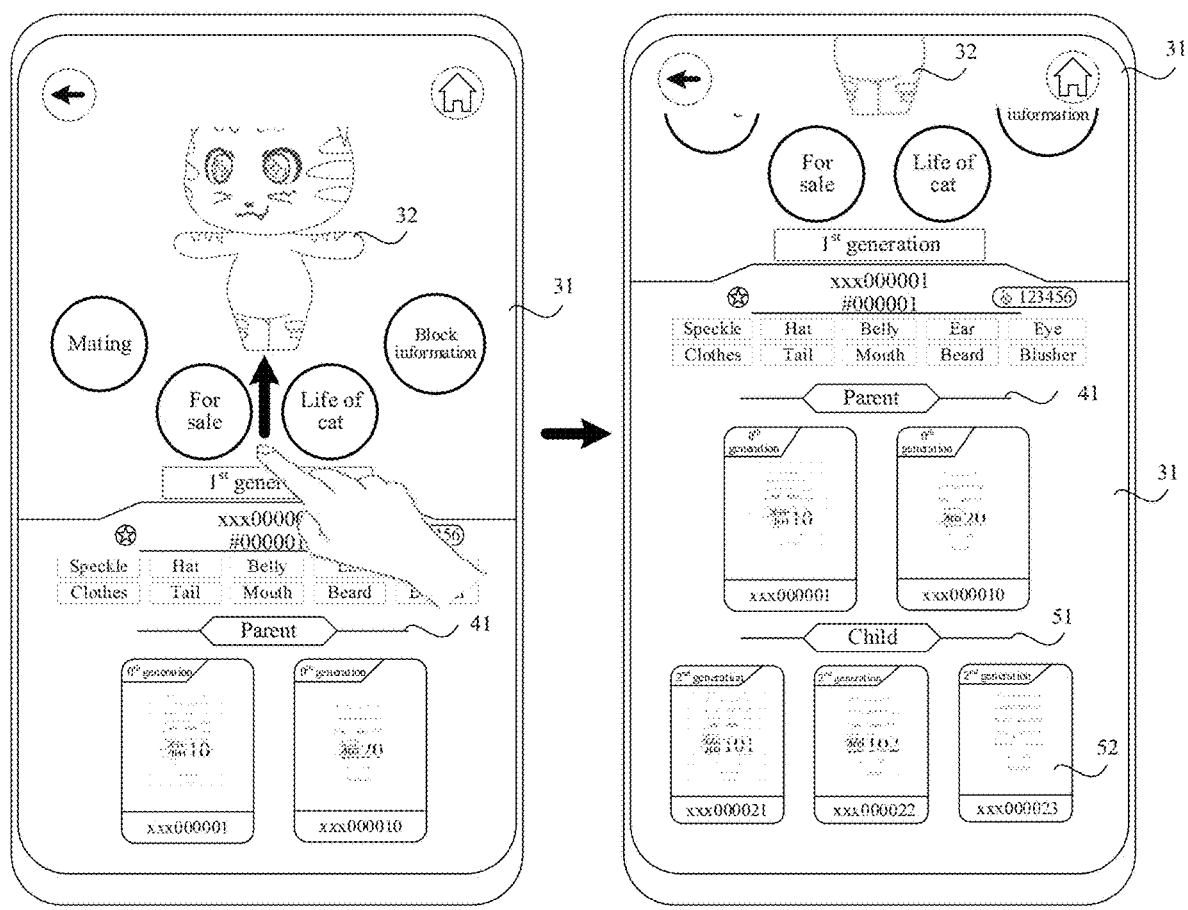
FIG. 9 is a schematic diagram of a display interface switching for displaying information of a virtual pet according to another exemplary embodiment of this disclosure.

Schematically, as shown in a left diagram in FIG. 9, movement to a first location 41 on a first display interface 31 is performed, to display information about parental virtual pets, and upward movement on the first display interface continues to be performed, to display a second location 51 on the first display interface. As shown in a right diagram in FIG. 9, a filial character field 52 is displayed on the second location 51, the diagram displays 3 filial character fields, and information about a filial pet cat is displayed in a card form on a filial character field. For example, summary information of a filial pet cat: a two-dimensional image picture, generation information, and a name of the filial pet cat is displayed on the filial character field 52.

To summarize, the terminal communicates with the blockchain system through the server, and obtains the information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface. The obtaining logic of obtaining the first information and the second information of the target virtual pet in batches ensures that the terminal can successfully obtain information.

Figure 10:
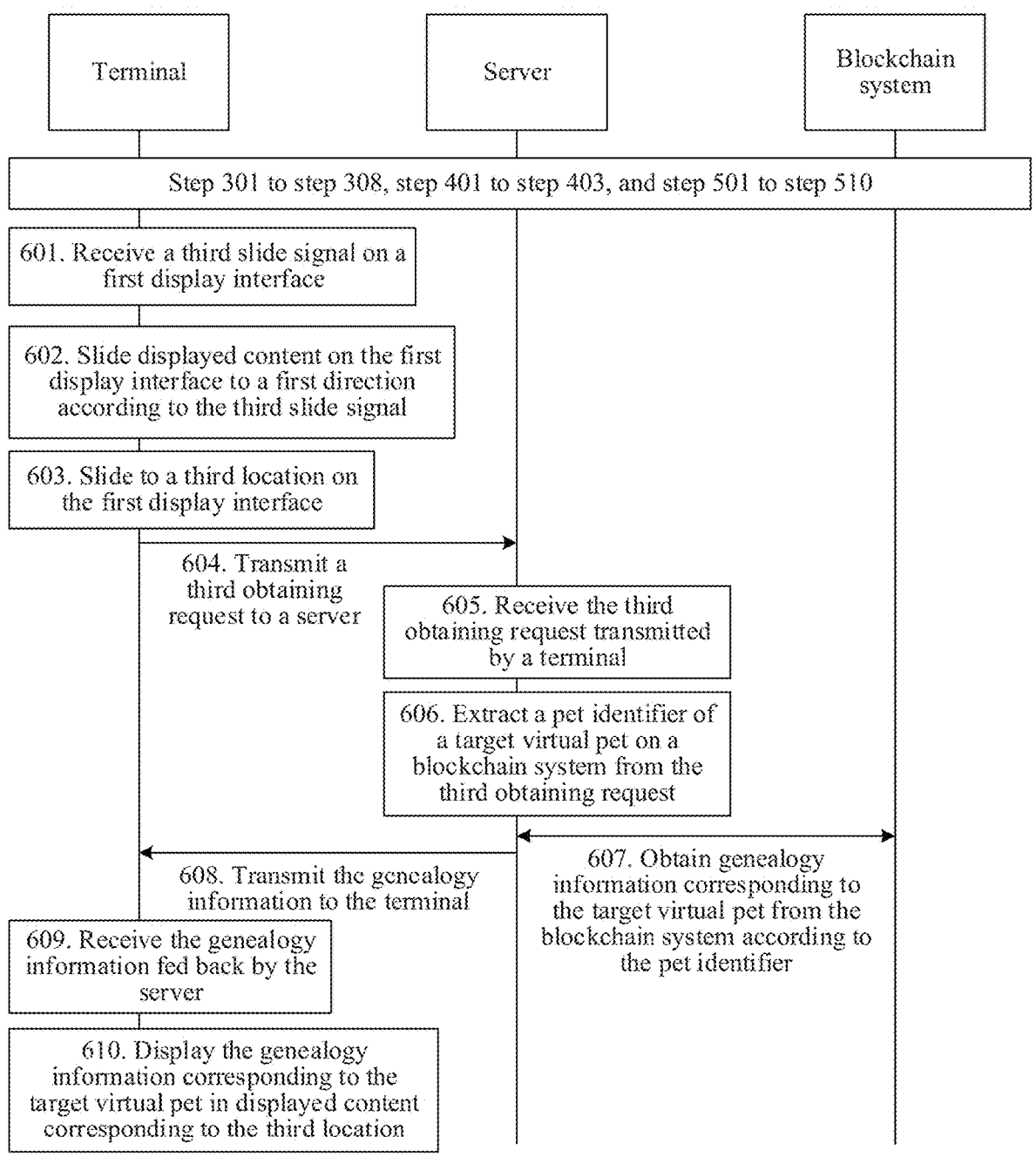
FIG. 10 is a flowchart of a method for displaying a virtual pet according to another exemplary embodiment of this disclosure.

FIG. 10 is a flowchart of a method for displaying a virtual pet according to another exemplary embodiment of this disclosure. This embodiment is described by using an example in which the method is applied to the implementation environment shown in FIG. 1. After displaying information about a filial virtual pet, a first display interface is further used for displaying genealogy information of a target virtual pet. Based on the embodiment shown in FIG. 7, step 601 to step 610 are added after steps 501 to 510, to display the first display interface of the target virtual pet. Specific steps are shown as follows:

Step 601. A terminal receives a third slide signal on the first display interface.

The terminal receives the third slide signal on the first display interface, and the third slide signal is a triggering signal generated by a slide gesture occurring on a touch screen. After the information about the filial virtual pet of the target virtual pet is displayed on the first display interface, a slide gesture occurs on the touch screen of the terminal, and the slide gesture delivers a triggering signal, that is, a third triggering signal to the terminal through the touch screen.

Step 602. The terminal slides displayed content on the first display interface to a first direction according to the third slide signal.

The terminal slides the displayed content on the first display interface to the first direction according to the third slide signal, hides a part of the displayed content slid to the first direction, and displays content not displayed before sliding to a direction opposite to the first direction. Optionally, the first direction may be a direction parallel to an up-down direction and/or a left-right direction of a portrait mode. Optionally, the displayed content includes: at least one of the information about the filial virtual pet, a combination of information about parental virtual pets and the information about the filial virtual pet, and a combination of information about the target virtual pet, the information about the parental virtual pets and the information about the filial virtual pet.

Step 603. Slide to a third location on the first display interface.

Sliding to the third location on the first display interface is performed. Grandparental character fields are displayed on the third location, and used for displaying the genealogy information corresponding to the target virtual pet. The genealogy information includes at least one of two-dimensional character images of grandparental virtual pets, generation information of the grandparental virtual pets, and names of the grandparental virtual pets.

Step 604. The terminal transmits a third obtaining request to the server.

The terminal transmits the third obtaining request to the server through a wireless network or a wired network. The third obtaining request includes a pet identifier of the target virtual pet, and is used for requesting to obtain the genealogy information of the target virtual pet stored on the blockchain system from the server.

Step 605. The server receives the third obtaining request transmitted by the terminal.

Step 606. The server extracts the pet identifier of the target virtual pet on the blockchain system from the third obtaining request.

The server obtains, after receiving the third obtaining request transmitted by the terminal, identity (ID) information of the target virtual pet from the third obtaining request, where the ID information can be identified and responded to by the blockchain system.

Step 607. The server obtains genealogy information of the target virtual pet from the blockchain system according to the pet identifier.

The server transmits the ID information of the target virtual pet to the blockchain system; the blockchain system detects, according to the ID information, whether an account corresponding to the target virtual pet activates a virtual pet system, whether the virtual pet system has been opened, and whether the target virtual pet is a $0^{th}$-generation virtual pet; in a case of simultaneously meeting three conditions that the account corresponding to the target virtual pet has activated the virtual pet system, the virtual pet system has been opened, and the target virtual pet is not the $0^{th}$-generation virtual pet, the blockchain system obtains the third information of the target virtual pet according to the ID information, and feeds the third information back to the server; and the server receives the third information fed back by the blockchain system. The third information of the target virtual pet includes the genealogy information.

Step 608. The server transmits the genealogy information to the terminal.

Step 609. The terminal receives the genealogy information fed back by the server.

Step 610. The terminal displays the genealogy information corresponding to the target virtual pet in displayed content corresponding to the third location.

In a case of sliding to the third location on the first display interface, the genealogy information corresponding to the target virtual pet is displayed on the grandparental character fields according to the third information.

Figure 11:
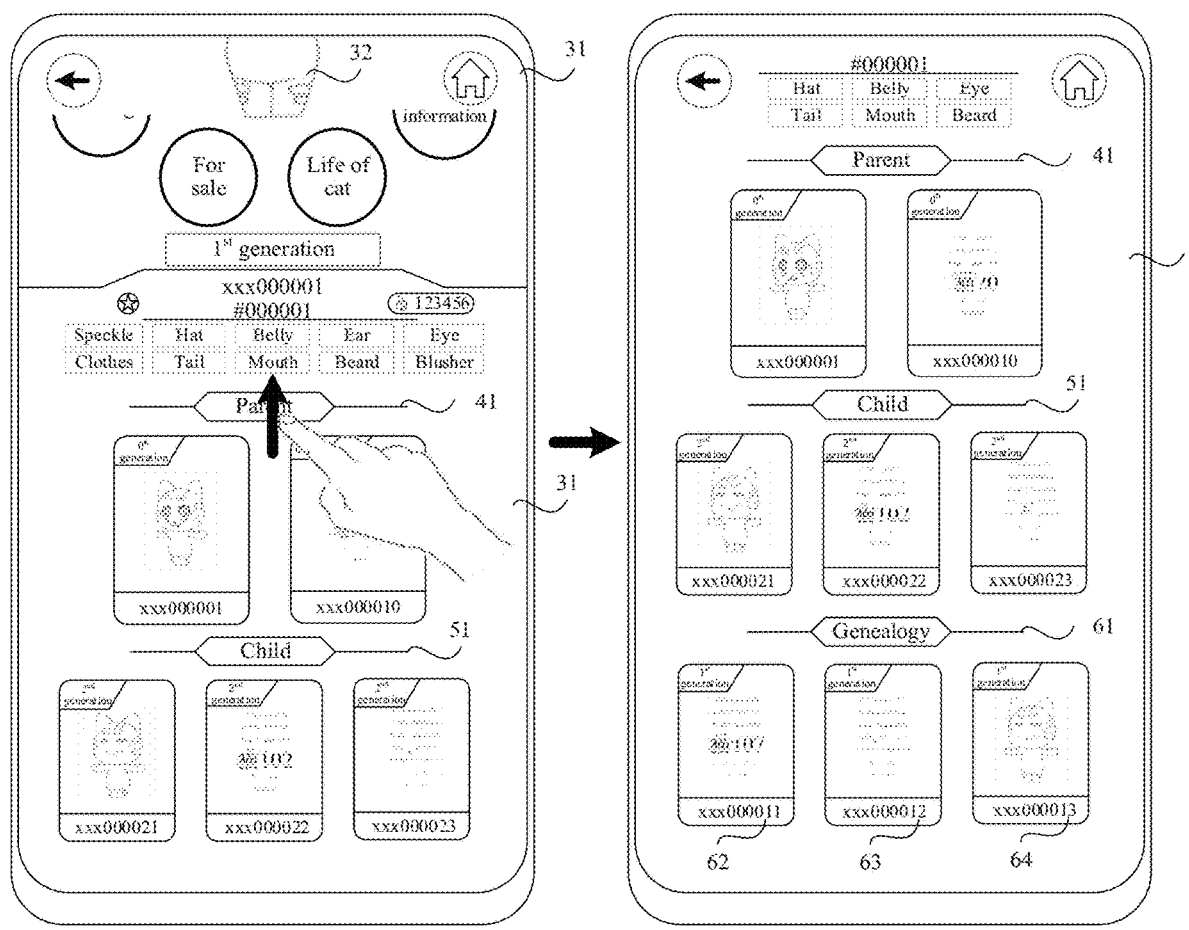
FIG. 11 is a schematic diagram of a display interface switching for displaying information of a virtual pet according to another exemplary embodiment of this disclosure.

Schematically, in FIG. 11, after sliding to a second location 51 on a first display interface 31, upward slide continues to be performed. As shown in a left diagram in FIG. 11, grandparental character fields 62, 63, and 64 are displayed until sliding to a third location 61. As shown in a right diagram in FIG. 11, genealogy information is displayed in a card form on each grandparental character field, and the genealogy information includes summary information of a grandparental pet cat: at least one of a two-dimensional image picture, generation information, and a name of the grandparental pet cat.

Figure 12:
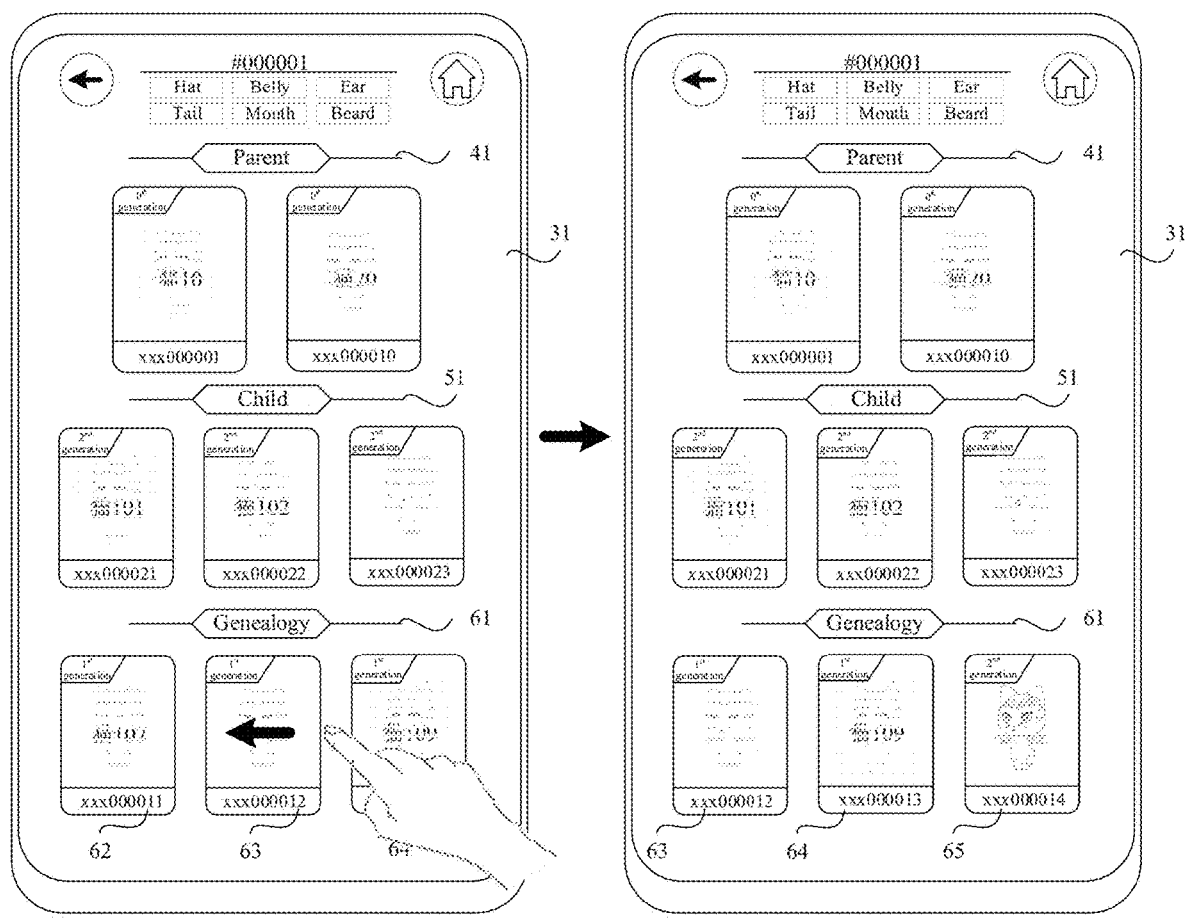
FIG. 12 is a schematic diagram of a display interface switching for displaying information of a virtual pet according to another exemplary embodiment of this disclosure.

Schematically, because there may be a plurality of filial pet cats and grandparental pet cats, the display interface cannot display them at the same time, and the terminal may slide left and right on the second location 51 and the third location 61, to display summary information of a plurality of virtual pets. Referring to FIG. 12, taking slide and display of genealogy information as an example, in a left diagram in FIG. 12, grandparental character fields 62, 63, and 64 are displayed, three different grandparental pet cats are displayed on the grandparental character fields, and content is slid left on a third location 61 on a first display interface 31. As shown in a left diagram in FIG. 12, according to a left slide gesture, a grandparental character field and displayed content on the field are hidden. As shown in a right diagram in FIG. 12, the grandparental character field 62 and summary information of a grandparental pet cat on the field are hidden, the grandparental character fields 63 and 64 and summary information of grandparental pet cats on the fields are moved left, and at the same time, a grandparental character field 65 and summary information of a fourth grandparental pet cat on the field are displayed.

To summarize, the terminal communicates with the blockchain system through the server, and obtains the information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface. The obtaining logic of obtaining the first information, the second information, and the third information of the target virtual pet in batches ensures that the terminal can successfully obtain information.

Figure 15:
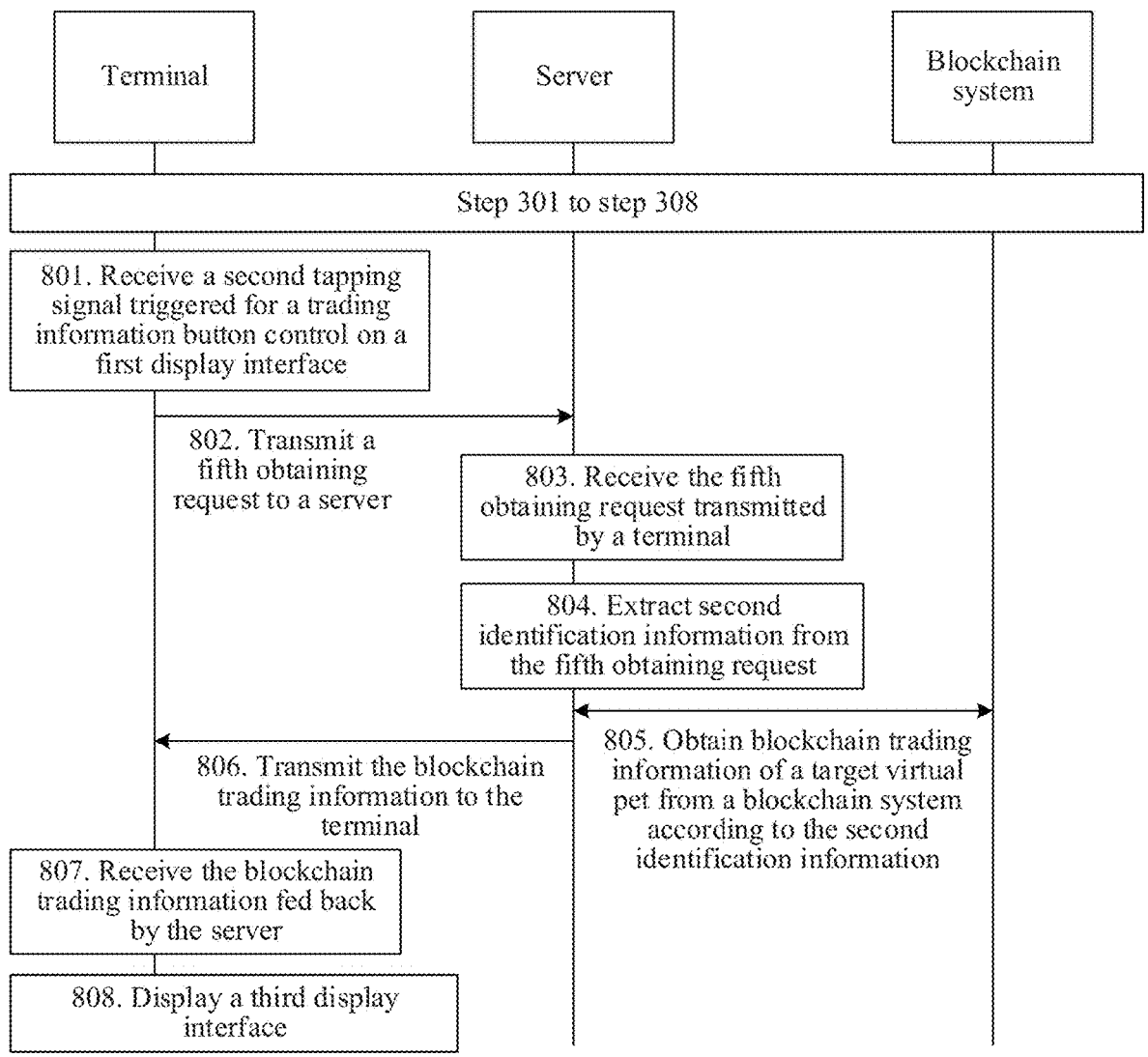
FIG. 15 is a flowchart of a method for displaying a virtual pet according to another exemplary embodiment of this disclosure.

Based on the embodiment shown in FIG. 3, the method for displaying a virtual pet provided in this application further includes a second display interface and a third display interface. An exemplary embodiment shown in FIG. 13 is described in detail for an implementation process of displaying the foregoing second display interface in the method for displaying a virtual pet, and an exemplary embodiment shown in FIG. 15 is described in detail for an implementation process of displaying the foregoing third display interface in the method for displaying a virtual pet.

Figure 13:
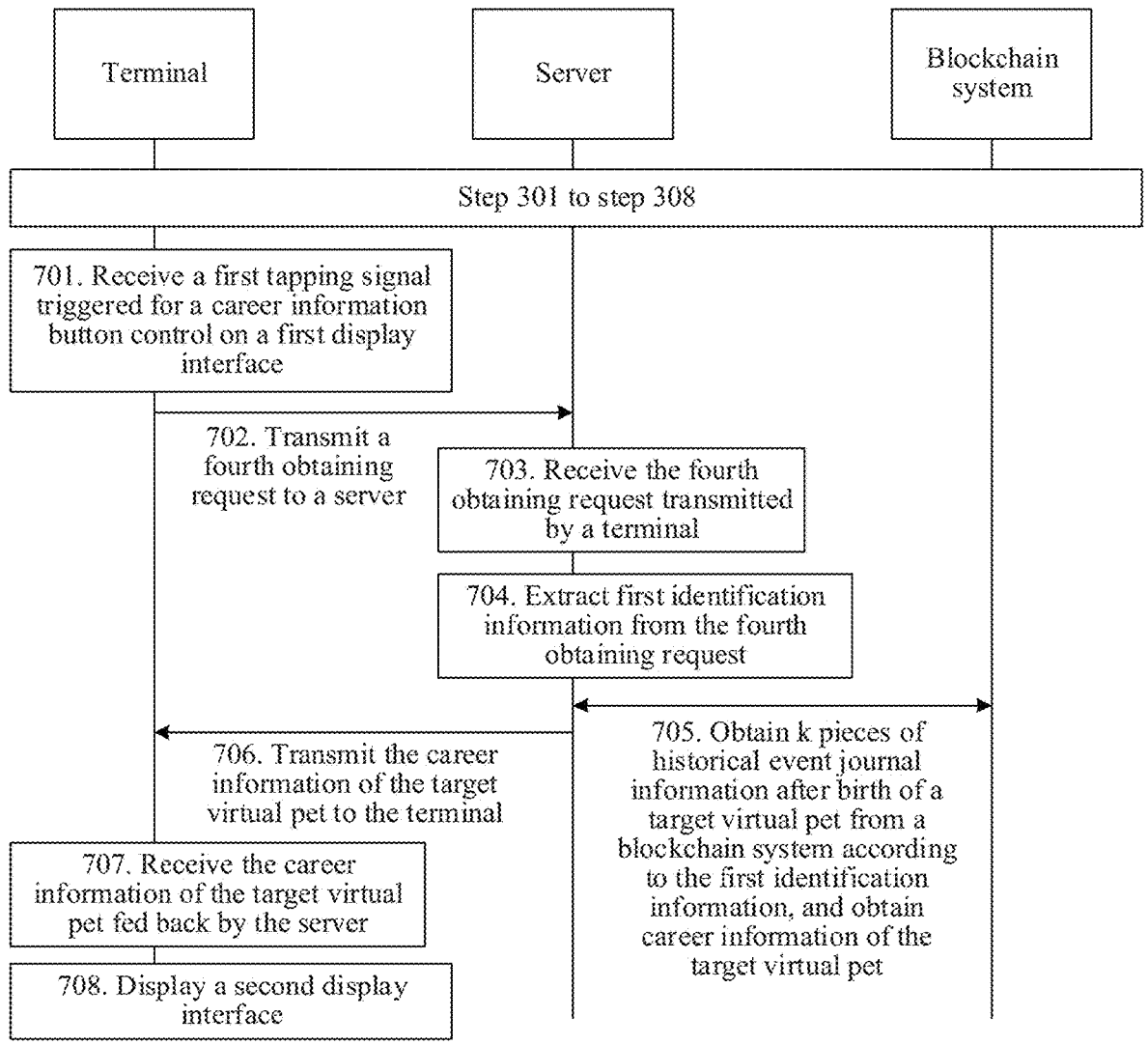
FIG. 13 is a flowchart of a method for displaying a virtual pet according to another exemplary embodiment of this disclosure.

FIG. 13 is a flowchart of a method for displaying a virtual pet according to another exemplary embodiment of this disclosure. This embodiment is described by using an example in which the method is applied to the implementation environment shown in FIG. 1. A first display interface further includes a career information button control. After displaying information about a target virtual pet on the first display interface, a terminal may further display a second display interface by triggering the career information button control. Based on the embodiment shown in FIG. 3, step 701 to step 708 are added after step 301 to step 308, to display the second display interface. Specific steps are shown as follows:

Step 701. A terminal receives a first tapping signal triggered for the career information button on the first display interface.

A tapping operation occurs in a screen area in which the career information button is located, the operation generates a triggering signal, that is, a first tapping signal, and the terminal receives the first tapping signal.

Step 702. The terminal transmits a fourth obtaining request to a server.

The terminal transmits the fourth obtaining request to the server through a wireless network or a wired network. The fourth obtaining request includes first identification information of the target virtual pet, and is used for requesting to obtain career information of the target virtual pet on the blockchain system from the server.

Step 703. The server receives the fourth obtaining request transmitted by the terminal.

Step 704. The server extracts first identification information from the fourth obtaining request.

The server obtains, after receiving the fourth obtaining request transmitted by the terminal, ID information of the target virtual pet from the fourth obtaining request, where the ID information can be identified and responded to by the blockchain system.

Step 705. The server obtains k pieces of historical event journal information after birth of the target virtual pet from the blockchain system according to the first identification information, and obtains career information of the target virtual pet.

The server transmits the ID information of the target virtual pet to the blockchain system; the blockchain system determines, according to the ID information, that the target virtual pet exists, and obtains k pieces of historical event journal information after birth of the target virtual pet, k being a positive integer; and feeds the k pieces of historical event journal information back to the server; and the server receives the k pieces of historical event journal information fed back by the blockchain system, and obtains the career information of the target virtual pet. The career information includes: a birth type, a birthday, and a birthplace of the target virtual pet; trading records of the target virtual pet, such as two trading parties, a trading time, and a trading place; and breeding information of the target virtual pet, such as at least one of player information corresponding to two breeding parties, virtual pet information, a breeding time, a breeding place, and a breeding result.

Step 706. The server transmits the career information of the target virtual pet to the terminal.

Step 707. The terminal receives the career information of the target virtual pet fed back by the server.

Step 708. The terminal displays the second display interface.

The terminal generates the second display interface through rendering according to the career information of the target virtual pet, and displays the second display interface.

Optionally, the terminal displays the k pieces of historical event journal information in a card form.

Figure 14:
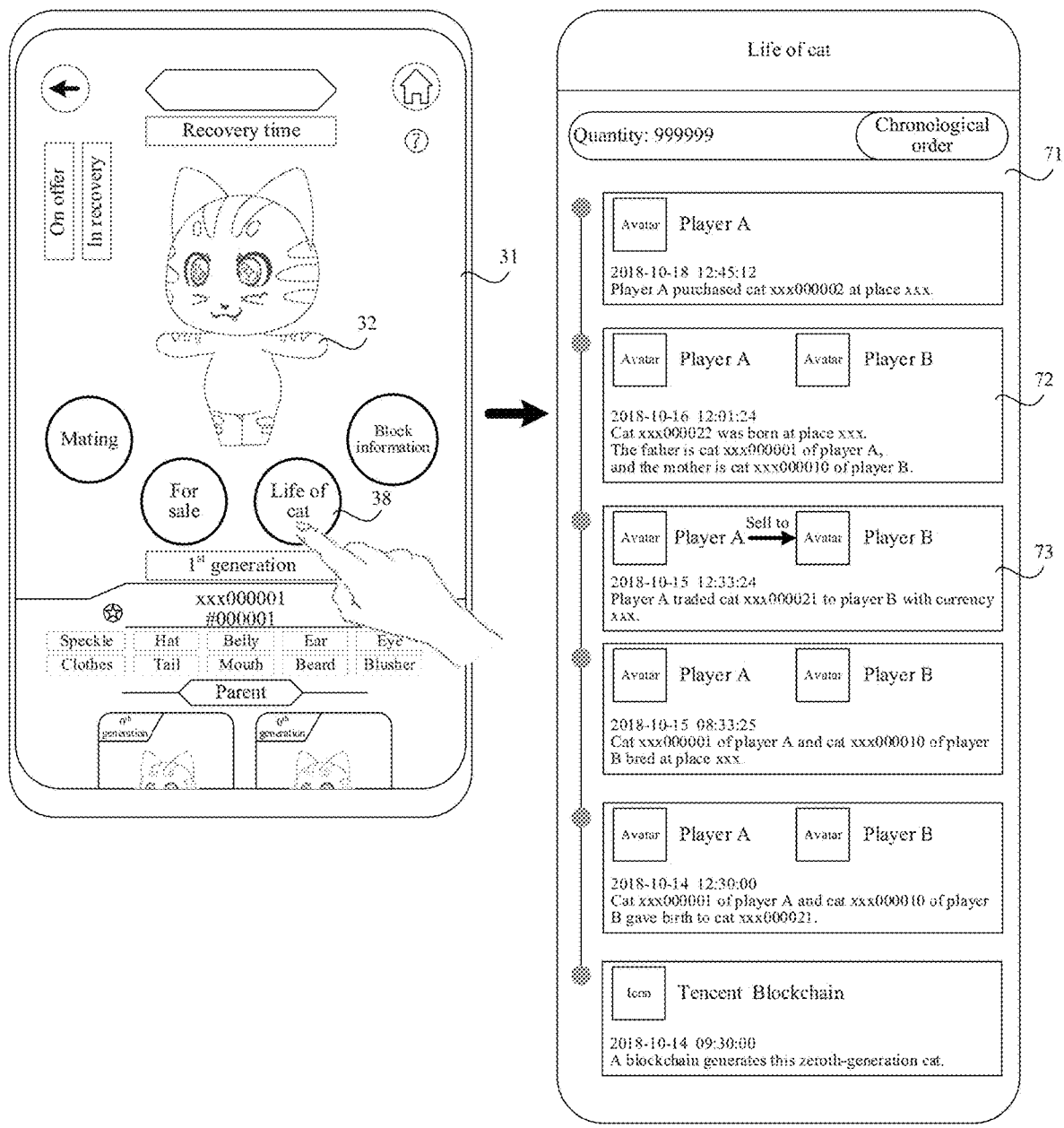
FIG. 14 is a schematic diagram of a display interface switching for displaying information of a virtual pet according to another exemplary embodiment of this disclosure.

Referring to FIG. 14, a career information button 38 is displayed on a first display interface 31. As shown in FIG. 14, the career information button 38 is named as "life of cat", and the button "life of cat" is tapped, to display a second display interface 71. As shown in a right diagram in FIG. 14, the second display interface 71 includes 6 pieces of historical event journal information displayed on the second display interface 71 in the form of cards, the cards are arranged in chronological order, and card information includes career information of a pet cat 32. For example, "2018.10.16 12:01:24, cat xxx000022 was born at place xxx; the father is cat xxx000001 of player A; and the mother is cat xxx000010 of player B" is display on a card 72; and "2018.10.15 12.33.24, player A traded cat xxx000021 to player B with currency xxx" is displayed on a card 73.

To summarize, the terminal communicates with the blockchain system through the server, and obtains the information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the second display interface. The terminal can display the career information of the virtual pet through the historical event journal information stored on the blockchain system.

FIG. 15 is a flowchart of a method for displaying a virtual pet according to another exemplary embodiment of this disclosure. This embodiment is described by using an example in which the method is applied to the implementation environment shown in FIG. 1. A first display interface further includes a trading information button. After displaying information about a target virtual pet on the first display interface, a terminal may further display a third display interface by triggering the trading information button. Based on the embodiment shown in FIG. 3, step 801 to step 808 are added after step 301 to step 308, to display the third display interface. Specific steps are shown as follows:

Step 801. A terminal receives a second tapping signal triggered for the trading information button on the first display interface.

A tapping operation occurs in a screen area in which the trading information button is located, the operation generates a triggering signal, that is, a second tapping signal, and the terminal receives the second tapping signal.

Step 802. The terminal transmits a fifth obtaining request to a server.

The terminal transmits the fifth obtaining request to the server through a wireless network or a wired network. The fifth obtaining request includes second identification information of the target virtual pet, and is used for requesting to obtain trading information of the target virtual pet on the blockchain system from the server.

Step 803. The server receives the fifth obtaining request transmitted by the terminal.

Step 804. The server extracts second identification information from the fifth obtaining request.

The server obtains, after receiving the fifth obtaining request transmitted by the terminal, ID information of the target virtual pet from the fifth obtaining request, where the ID information can be identified and responded to by the blockchain system.

Step 805. The server obtains blockchain trading information of the target virtual pet from the blockchain system according to the second identification information.

The server transmits the ID information of the target virtual pet to the blockchain system; the blockchain system determines, according to the ID information, that the target virtual pet exists, and obtains most recent trading journal information of the target virtual pet; and feeds the most recent trading journal information back to the server; and the server receives the most recent trading journal information fed back by the blockchain system, and obtains the trading information of the target virtual pet. The trading information includes: at least one of a trading hash value, a service type, a trading type, a trading initiating party, a trading receiving party, a block height, a block creation time, the number of transactions, a consensus node name, a consensus node confirming time, and a consensus confirming state.

Step 806. The server transmits the trading information of the target virtual pet to the terminal.

Step 807. The terminal receives the trading information of the target virtual pet fed back by the server.

Step 808. The terminal displays the third display interface.

The terminal generates the third display interface through rendering according to the trading information of the target virtual pet, and displays the third display interface, and the third display interface includes core information of most recent trading: a hash value and a block height.

Figure 16:
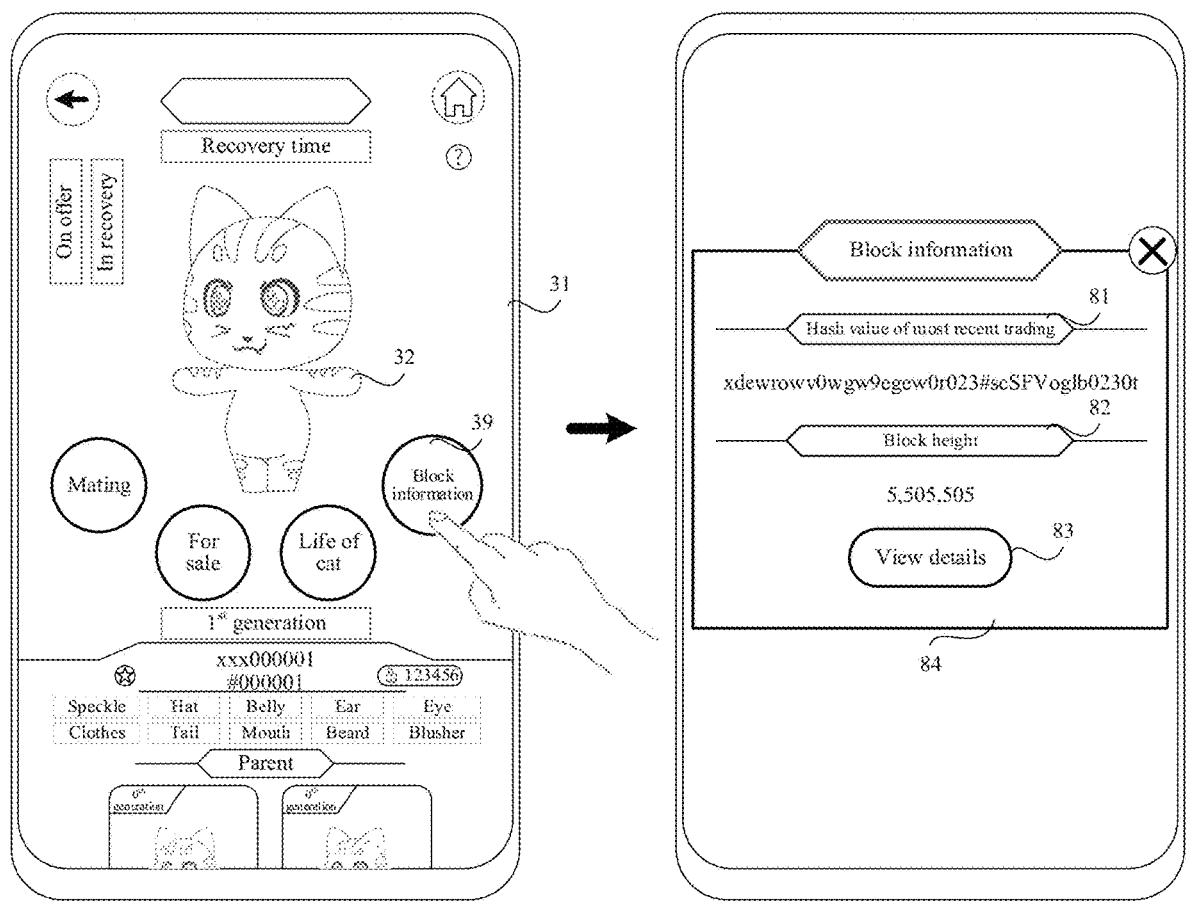
FIG. 16 is a schematic diagram of a display interface switching for displaying information of a virtual pet according to another exemplary embodiment of this disclosure.

Referring to FIG. 16, a trading information button 39 is displayed on a first display interface 31. As shown in a left diagram in FIG. 16, the trading information button 39 is named as "block information", and the button "block information" may be tapped, to display a third display interface 84. As shown in a right diagram in FIG. 16, the third display interface 84 includes a hash value 81 and a block height 82 of most recent trading. The hash value 81 is represented as a character string (e.g., the character string may be "xdewrowv0wgw9egew0r023#scSFVoglb0230t"); and the block height 82 is represented as a string of numbers (e.g., the numeric string may be "5,505,505"). The third display interface 84 further includes a detail button control 83. Detail information of the most recent trading may be viewed by tapping the detail button control 83, and the detail information includes trading information of the most recent trading.

To summarize, the terminal communicates with the blockchain system through the server, and obtains the information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the third display interface. By obtaining the block information through the trading information, the hash value and the block height of the most recent trading can be obtained.

Figure 17:
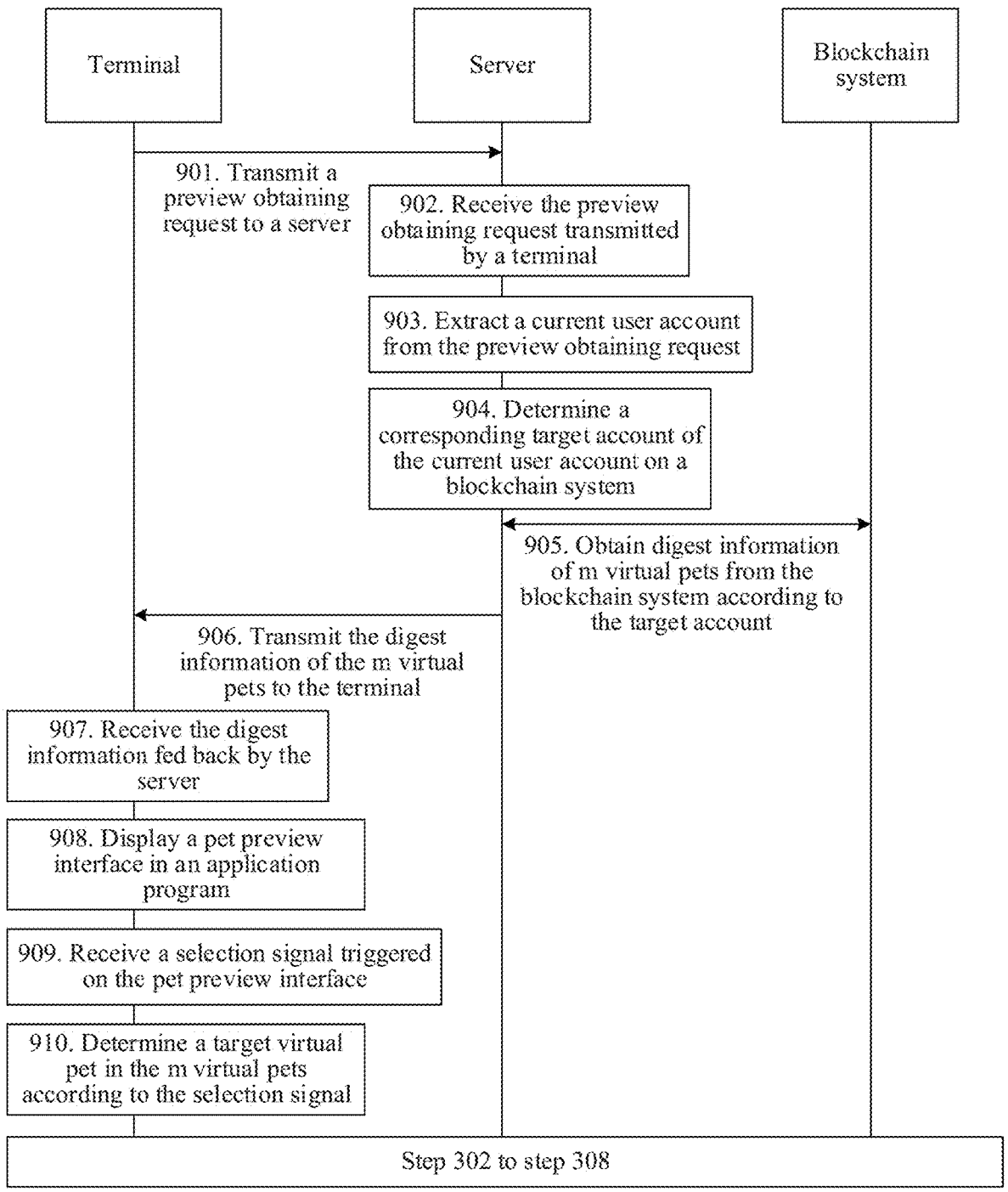
FIG. 17 is a flowchart of a method for displaying a virtual pet according to another exemplary embodiment of this disclosure.

Before displaying a first display interface, a terminal displays a pet preview interface in an application program. Based on the embodiment shown in FIG. 3, implementation of displaying a pet preview interface in a method for displaying a virtual pet is described in detail in an exemplary embodiment shown in FIG. 17. FIG. 17 is a flowchart of a method for displaying a virtual pet according to another exemplary embodiment of this disclosure. This embodiment is described by using an example in which the method is applied to the implementation environment shown in FIG. 1. Based on the embodiment shown in FIG. 3, step 301 is replaced with step 901 to step 910, a terminal displays a pet preview interface, selects a target virtual pet on the pet preview interface, and finally determines the target virtual pet in an application program. Specific steps are shown as follows:

Step 901. The terminal transmits a preview obtaining request to the server.

The terminal transmits the preview obtaining request to the server, where the preview obtaining request is used for requesting to display the pet preview interface; and the preview obtaining request includes a current user account.

Step 902. The server receives the preview obtaining request transmitted by the terminal.

Step 903. The server extracts the current user account from the preview obtaining request.

Step 904. The server determines a target account corresponding to the current user account on a blockchain system.

The server stores a correspondence table, and the correspondence table is used for indicating a correspondence between a user account and an account on the blockchain system. The server searches for the target account corresponding to the current user account on the blockchain system according to the correspondence table, to determine the target account.

Step 905. The server obtains summary information of m virtual pets from the blockchain system according to the target account, m being a positive integer.

The server transmits the target account to the blockchain system; the blockchain system receives the target account, and obtains summary information of m corresponding virtual pets according to the target account, m being a positive integer; the blockchain system feeds the summary information of the m virtual pets back to the server; and the server obtains the summary information of the m virtual pets. Summary information of a virtual pet may include: at least one of generation information of the virtual pet, a two-dimensional image of the virtual pet, a name of the virtual pet, and/or a breeding recovery time of the virtual pet.

Step 906. The server transmits the summary information of the m virtual pets to the terminal.

Step 907. The terminal receives the summary information fed back by the server.

The terminal receives the summary information fed back by the server, and then step 905 to step 907 are repeated, to obtain the summary information of the virtual pets in batches.

Step 908. Display the pet preview interface in the application program.

The terminal displays the pet preview interface in the application program, where the pet preview interface includes the summary information of the m virtual pets. Optionally, in a case that the blockchain does not complete confirmation for a virtual pet, information about the virtual pet cannot be viewed, where the information includes summary information and detail information.

Figure 18:
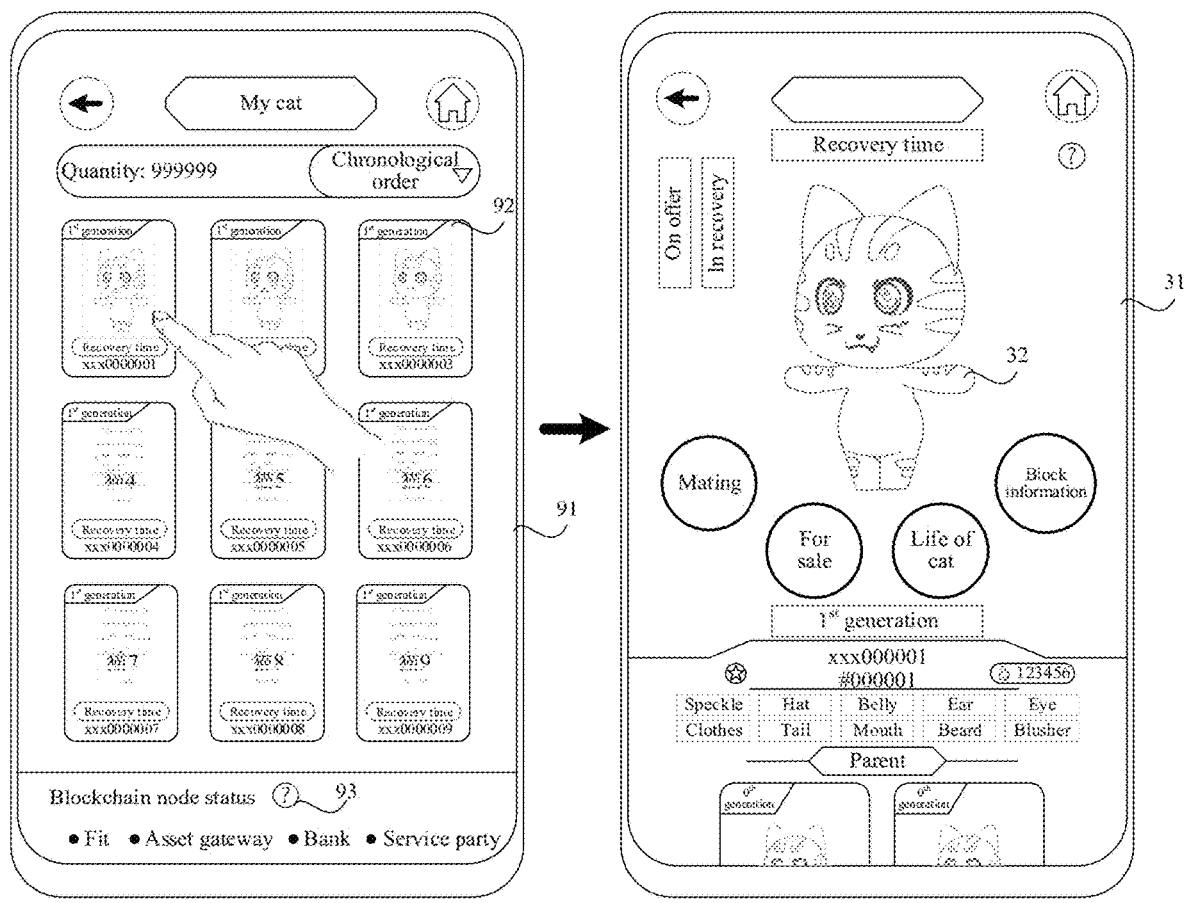
FIG. 18 is a schematic diagram of a display interface switching for displaying information of a virtual pet according to another exemplary embodiment of this disclosure.

Schematically, a pet preview interface 91 is shown in a left diagram in FIG. 18, summary information of pet cats is arranged and displayed on the pet preview interface 91 in a nine-square shape, and the summary information of the pet cats is displayed in a card form. For example, a card 92 displays summary information of pet cat xxx000003. The pet cats displayed on the pet preview interface 91 are pet cats owned under the same game account. Optionally, arrangement on the pet preview interface 91 may be in order of birthdays of the pet cats, identifiers of the pet cats, breeding recovery times, collection priorities, breeding priorities, mating priorities, or selling priorities.

Step 909. The terminal receives a selection signal triggered on the pet preview interface.

The terminal displays the pet preview interface in the application program, a selection operation occurs on a touch screen, the operation generates a selection signal in a display area in which a selected virtual pet is located, and the terminal receives the selection signal.

Step 910. Determine the target virtual pet in the m virtual pets according to the selection signal.

It is determined, according to the selection signal, that the selected virtual pet is the target virtual pet, and the m virtual pets include the target virtual pet.

Schematically, a pet preview interface 91 is displayed in a left diagram in FIG. 18. A display card of one of pet cats, such as a card of a first pet cat, is tapped on the pet preview interface 91. The terminal receives a selection signal triggered on the foregoing card, and determines that the pet cat is a target pet cat, that is, a pet cat 32 and displays a first display interface 31. Detail information of the pet cat 32 is displayed on the first display interface 31.

To summarize, the terminal communicates with the blockchain system through the server, and obtains the preview information of the user account corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the summary information of the virtual pets displayed on the pet preview interface. The processing logic of obtaining the summary information of the virtual pets in batches ensures that the terminal can successfully obtain the summary information of the virtual pets.

Figure 19:
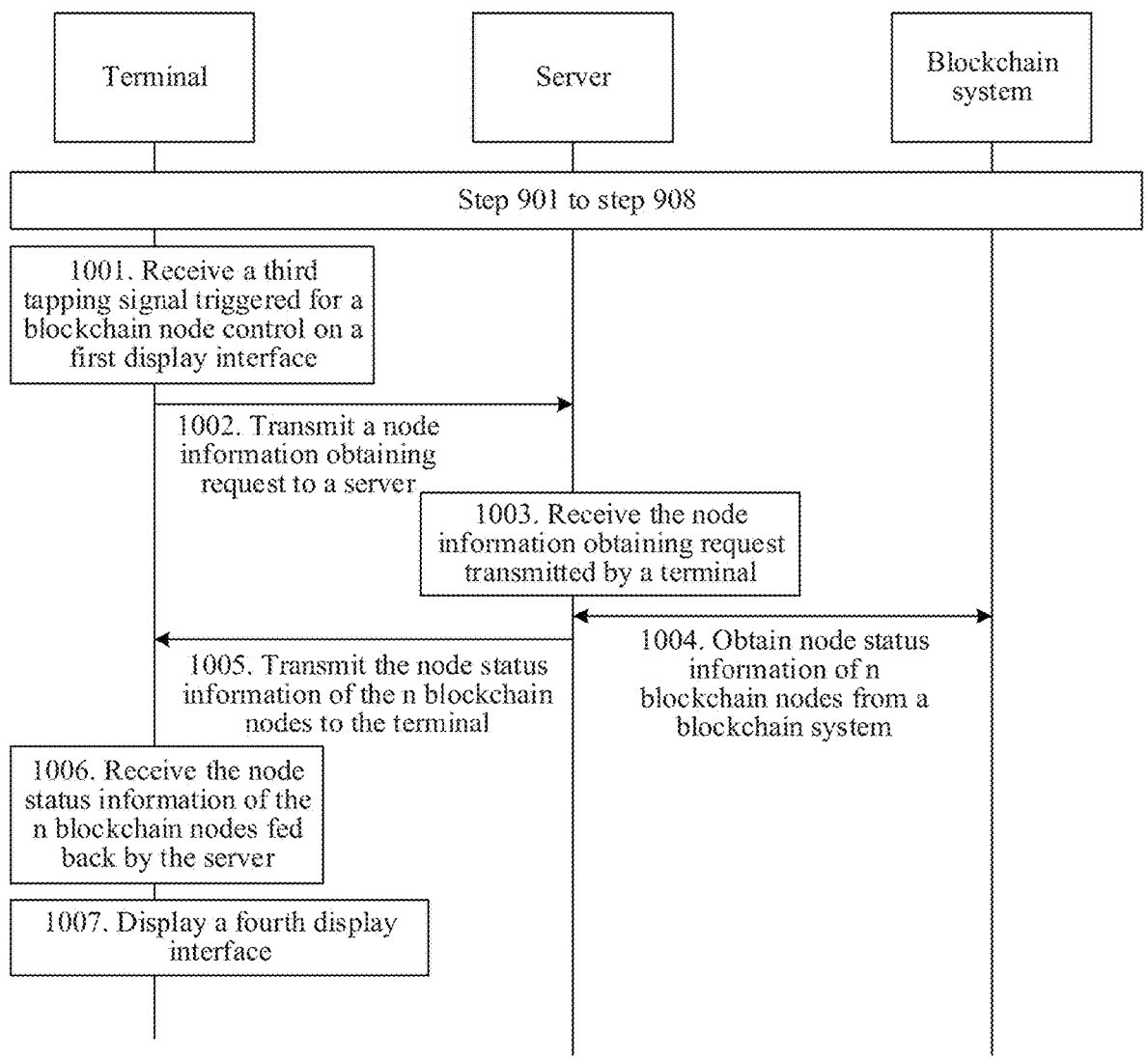
FIG. 19 is a flowchart of a method for displaying a virtual pet according to another exemplary embodiment of this disclosure.

FIG. 19 is a flowchart of a method for displaying a virtual pet according to another exemplary embodiment of this disclosure. This embodiment is described by using an example in which the method is applied to the implementation environment shown in FIG. 1. Based on the embodiment shown in FIG. 17, the pet preview interface further includes a blockchain node control. Step 1001 to step 1007 are added after step 908, to display a fourth display interface through the blockchain node control. Specific steps are shown as follows:

Step 1001. A terminal receives a third tapping signal triggered for the blockchain node control on a first display interface.

Figure 20:
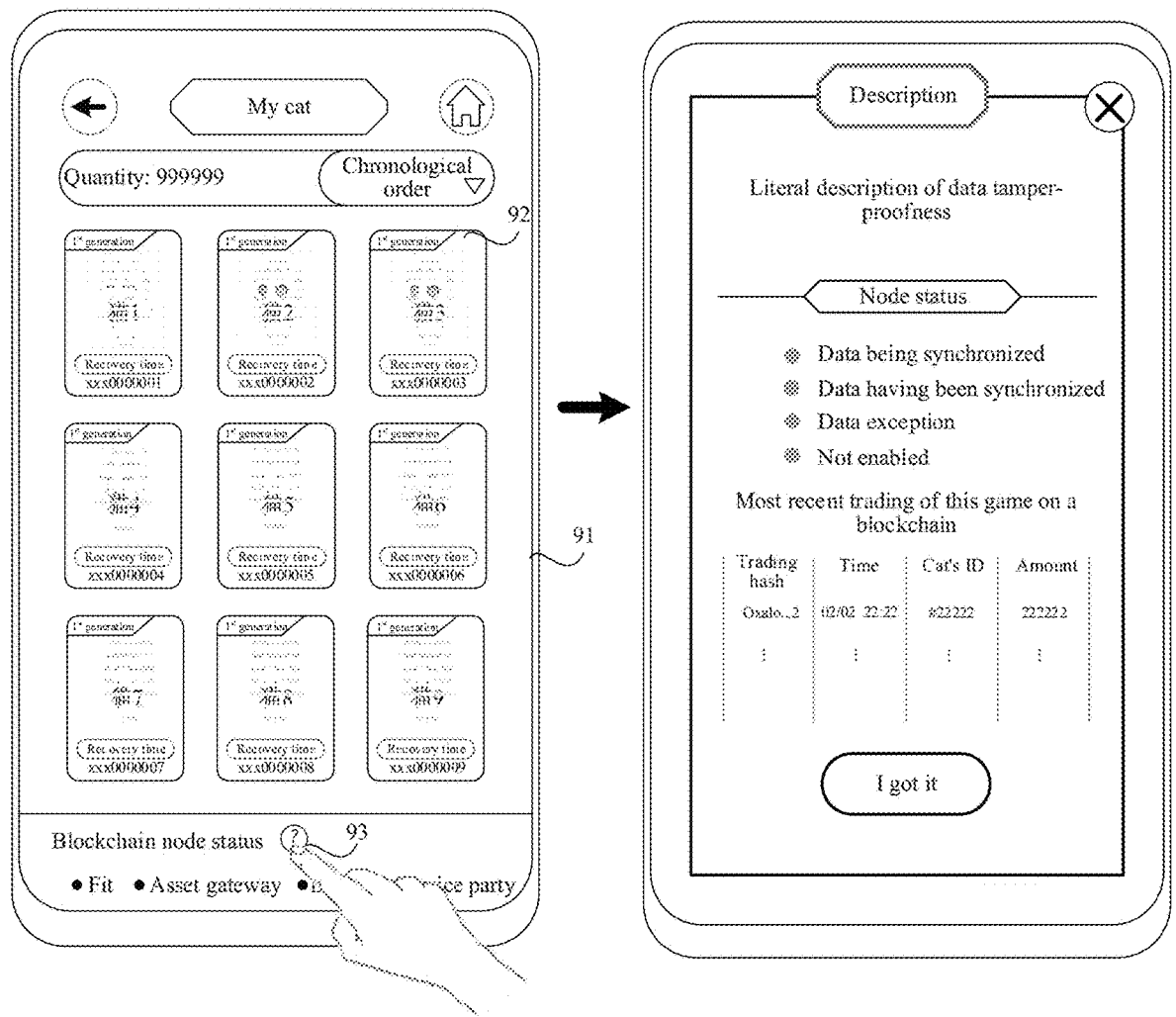
FIG. 20 is a schematic diagram of a display interface switching for displaying information of a virtual pet according to another exemplary embodiment of this disclosure.

The blockchain node control is displayed on the pet preview interface, a tapping operation occurs in a screen area in which the blockchain node control is located, the operation generates a triggering signal, that is, the third tapping signal, and the terminal receives the third tapping signal. Referring to FIG. 20, in a left diagram, a blockchain node control 93 is displayed on a pet preview interface 91. Schematically, the blockchain node control 93 is tapped, a tapping operation generates a triggering signal, that is, the third tapping signal, and the terminal receives the third tapping signal.

Step 1002. The terminal transmits a node information obtaining request to a server.

The terminal receives the third tapping signal, and transmits the node information obtaining request to the server, where the node information obtaining request includes a current user account.

Step 1003. The server receives the node information obtaining request transmitted by the terminal.

Step 1004. The server obtains node status information of n blockchain nodes from a blockchain system, n being a positive integer.

The server obtains a target account corresponding to the current user account on the blockchain from the node information obtaining request, and obtains node status information of n blockchain nodes from the blockchain system according to the target account, where the node status information of the n blockchain nodes includes most recent trading journal information.

Step 1005. The server transmits the node status information of the n blockchain nodes to the terminal.

Step 1006. The terminal receives the node status information of the n blockchain nodes fed back by the server.

Step 1007. The terminal displays the fourth display interface.

The terminal displays the fourth display interface according to the node status information of the n blockchain nodes, where the fourth display interface includes a node status and most recent trading of a game on the blockchain. Schematically, referring to a right diagram in FIG. 20, node statuses displayed on the fourth display interface include: data being synchronized, data having been synchronized, data exception, and being not enabled; and the most recent trading of the game on the blockchain displayed on the fourth display interface includes: a trading item, a trading time, a name of a traded virtual pet, and a trading amount.

To summarize, the terminal communicates with the blockchain system through the server, and obtains the information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the fourth display interface.

The terminal displays current communication situations of nodes of the blockchain by obtaining node statuses of the blockchain nodes, so that a user understands the blockchain system more clearly.

Figure 21:
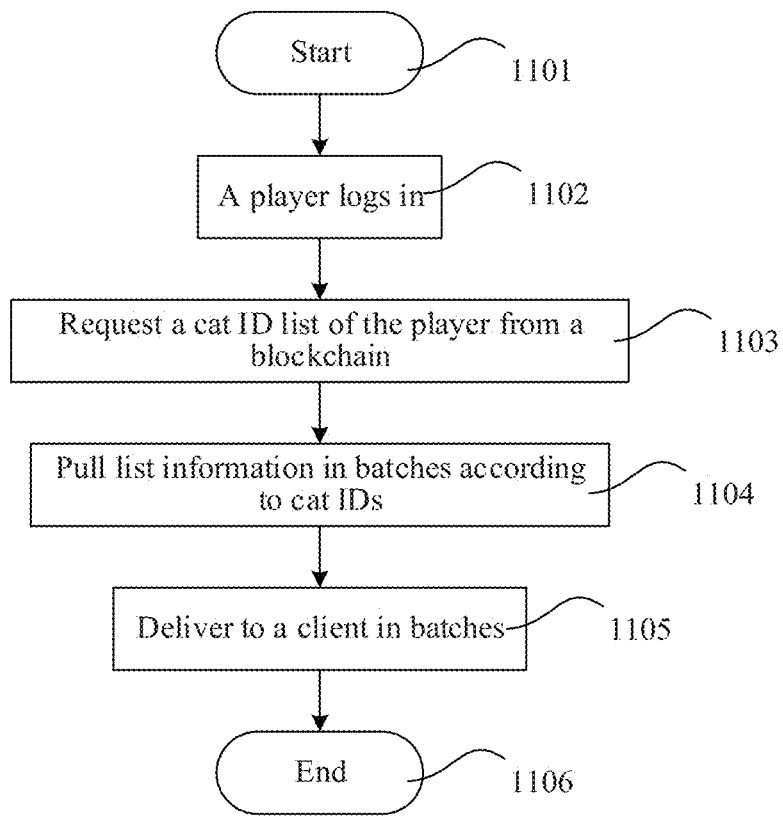
FIG. 21 is a flowchart of a method for displaying a virtual pet according to another exemplary embodiment of this disclosure.

FIG. 21 is a flowchart of a method for displaying a virtual pet according to another exemplary embodiment of this disclosure. This embodiment is described by using an example in which the method is applied to the implementation environment shown in FIG. 1. The method includes the following steps:

Step 1101. Start.

Step 1102. A player logs in.

The player requests to log in to a game client on a terminal, the request carrying a user account; an access server determines the request as a valid request, and requests to log in to the game client from a game server; the game server allows, according to the user account, the player to log in to the game client; and the player logs in to the game client.

Step 1103. Request a cat ID list of the player from a blockchain.

After logging in to the game client, the player transmits a request of obtaining a cat ID list to the server; the server obtains the user account of the player on the blockchain according to the obtaining request; and the server pulls cat ID lists in batches from the blockchain according to the user account on the blockchain, and the blockchain stores information about the cat ID lists.

Step 1104. Pull list information in batches according to cat IDs.

Summary information of cats is pulled in batches according to the cat IDs. For example, sorting may be performed according to time: the first cat is first generated, the second cat is secondly generated, and the rest can be deduced by analogy. In a pulling process, the server pulls the first to the $60^{th}$ cat in the first batch, pulls the $61^{st}$ to the $120^{th}$ cats in the second batch, and the rest can be deduced by analogy, until all the cat ID lists are pulled completely.

Step 1105. Deliver to the client in batches.

The pulled cat ID lists are delivered to the client in batches, and the client receives and displays the cat ID lists.

Step 1106. End.

To summarize, the terminal communicates with the blockchain system through the server, obtains the summary information of the virtual pet list corresponding to the user account stored on the blockchain system, and displays the pet preview interface according to the summary information. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the summary information of the virtual pets displayed on the pet preview interface.

Figure 22:
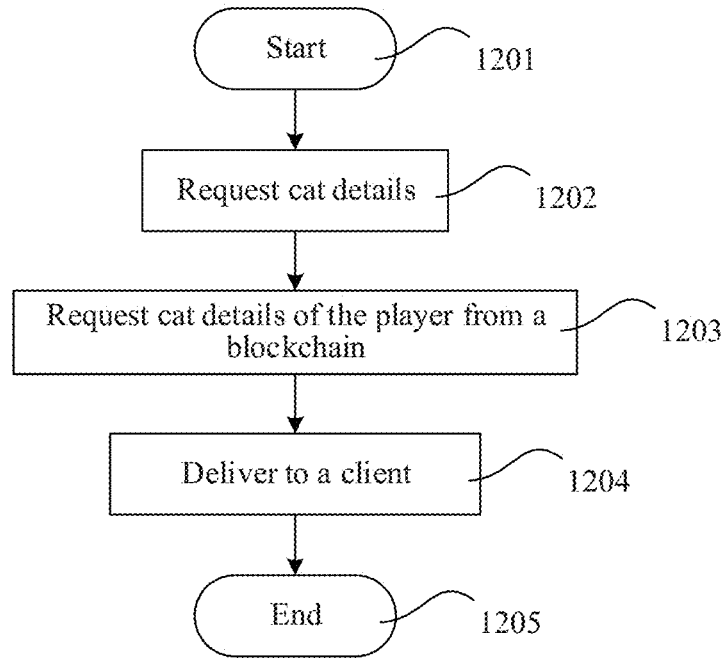
FIG. 22 is a flowchart of a method for displaying a virtual pet according to another exemplary embodiment of this disclosure.

FIG. 22 is a flowchart of a method for displaying a virtual pet according to another exemplary embodiment of this disclosure. This embodiment is described by using an example in which the method is applied to the implementation environment shown in FIG. 1. The method includes the following steps:

Step 1201. Start.

Step 1202. Request cat details.

A player logs in to a game client, the client displays a cat ID list, the player taps any cat in the cat ID list, and a terminal transmits a cat details request to a server, where the cat details request includes a cat ID.

Step 1203. Request cat details of the player from a blockchain.

The server obtains the cat details of the player from the blockchain according to the cat ID, where the cat details include the cat ID, generation information, a name, image characteristics, an identifier, and a breeding recovery time; and the cat details further include cat IDs, generation information, and names of parental cats.

Step 1204. Deliver to the client.

The server delivers the cat details of the player to the client through a communication network.

Step 1205. End.

To summarize, the terminal communicates with the blockchain system through the server, and obtains the information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface.

Figure 23:
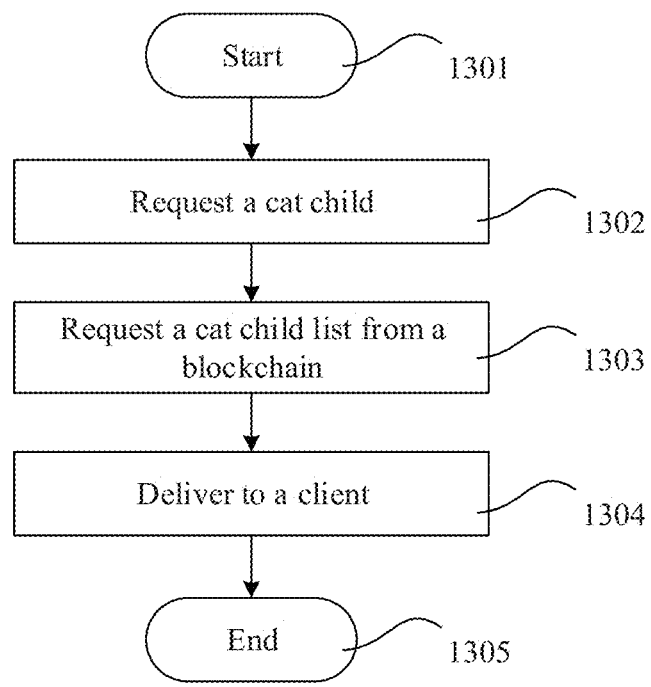
FIG. 23 is a flowchart of a method for displaying a virtual pet according to another exemplary embodiment of this disclosure.

FIG. 23 is a flowchart of a method for displaying a virtual pet according to another exemplary embodiment of this disclosure. This embodiment is described by using an example in which the method is applied to the implementation environment shown in FIG. 1. The method includes the following steps:

Step 1301. Start.

Step 1302. Request a cat child.

A terminal displays a cat details interface, slides to a cat child information location on the interface, triggers a request, the request being to request to deliver a cat child list and the request carrying a cat ID, and transmits the request to a server.

Step 1303. Request the cat child list from a blockchain.

The server obtains the cat child list from the blockchain according to the foregoing request, where the cat child list includes summary information of a cat child: an ID, generation information, and a name of the cat child.

Step 1304. Deliver to a client.

The server delivers the cat child list to the client.

Step 1305. End.

To summarize, the terminal communicates with the blockchain system through the server, and obtains information about a filial virtual pet corresponding to a target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the first display interface.

Figure 24:
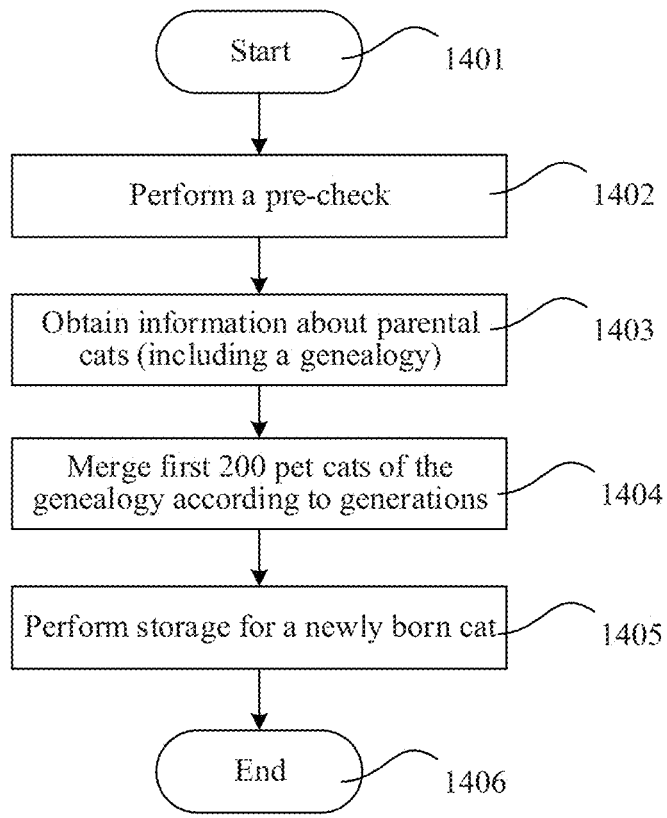
FIG. 24 is a flowchart of a method for displaying a virtual pet according to another exemplary embodiment of this disclosure.

FIG. 24 is a flowchart of a method for displaying a virtual pet according to another exemplary embodiment of this disclosure. This embodiment is described by using an example in which the method is applied to the implementation environment shown in FIG. 1. The method includes the following steps:

Step 1401. Start.

Step 1402. Perform a pre-check.

A terminal displays a cat details interface, slides to a cat genealogy information location, triggers a request, the request being to request to deliver a genealogy list and the request carrying a cat ID, and transmits the request to a server.

The server checks whether a player has activated a cat system, whether the cat system has been opened, and whether a cat is a $0^{th}$-generation cat.

Step 1403. Obtain information about parental cats, including a genealogy.

If a determining result is that the player has activated the cat system, the cat system has been opened, and the cat is not a $0^{th}$-generation cat, the server obtains a genealogy list from a blockchain according to a cat ID, where the genealogy list includes summary information of a genealogy: an ID, generation information, and a name of the genealogy.

Step 1404. Merge first predetermined number (e.g., 200) pet cats of the genealogy according to generations.

The genealogy information includes genealogy information of a paternal pet cat and genealogy information of a maternal pet cat, and the genealogy information of the paternal pet cat and the genealogy information of the maternal pet cat are merged. In a case that the genealogy information corresponds to more than 200 pet cats, 200 pet cats are sorted in descending order of generations, and summary information of first 200 pet cats whose generations are high is obtained.

Step 1405. Perform storage for a newly born cat.

The summary information of the first 200 pet cats whose generations are high is stored for the newly born cat as the genealogy information, and finally the genealogy information of the cat is obtained.

Step 1406. End.

To summarize, the terminal communicates with the blockchain system through the server, and obtains the genealogy information corresponding to the target virtual pet stored on the blockchain system. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the genealogy information of the target virtual pet displayed on the first display interface.

Figure 25:
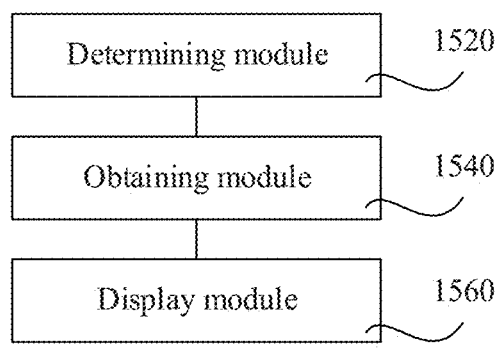
FIG. 25 is a block diagram of an apparatus for displaying a virtual pet according to an exemplary embodiment of this disclosure.

FIG. 25 is a block diagram of an apparatus for displaying a virtual pet according to an exemplary embodiment of this disclosure. The apparatus includes:

a determining module 1520, configured to determine a to-be-displayed target virtual pet in an application program;

an obtaining module 1540, configured to obtain first information of the target virtual pet from a server, the first information being information that is stored on a blockchain system and that corresponds to the target virtual pet; and a display module 1560, configured to display a first display interface of the target virtual pet, the first display interface including the first information of the target virtual pet.

In some embodiments, the obtaining module 1540 is further configured to:

transmit a first obtaining request to the server, the first obtaining request including a pet identifier of the target virtual pet on the blockchain system; and receive the first information fed back by the server, the first information being obtained by the server from the blockchain system according to the pet identifier, where the first information includes at least one of the following information: a three-dimensional character image of the target virtual pet, generation information of the target virtual pet, a name of the target virtual pet, an identifier of the target virtual pet, image characteristic information of the target virtual pet, and a breeding recovery time of the target virtual pet.

In some embodiments, the first information further includes information about parental virtual pets of the target virtual pet; and the display module 1560 is further configured to:

receive a first slide signal on the first display interface;

slide displayed content on the first display interface to a first direction according to the first slide signal; and display, in a case of sliding to a first location on the first display interface, the information about the parental virtual pets in displayed content corresponding to the first location.

In some embodiments, the display module 1560 is further configured to:

display a paternal character field and a maternal character field on the first location, where a paternal virtual pet corresponding to the target virtual pet is displayed on the paternal role field, and a maternal virtual pet corresponding to the target virtual pet is displayed on the maternal character field.

In some embodiments, the first display interface is further used for displaying information about a filial virtual pet of the target virtual pet; and the display module 1560 is further configured to:

receive a second slide signal on the first display interface;

slide displayed content on the first display interface to a first direction according to the second slide signal;

obtain second information of the target virtual pet from the server in a case of sliding to a second location on the first display interface, where the second information is information that is stored on the blockchain system and that is about the filial virtual pet corresponding to the target virtual pet; and display the information about the filial virtual pet in displayed content corresponding to the second location.

In some embodiments, the display module 1560 is further configured to:

display at least one filial character field in the displayed content corresponding to the second location, where the filial virtual pet corresponding to the target virtual pet is displayed on each filial character field.

In some embodiments, the display module 1560 is further configured to:

transmit a second obtaining request to the server in the case of sliding to the second location on the first display interface, the second obtaining request including a pet identifier of the target virtual pet on the blockchain system; and receive the second information fed back by the server, the second information being obtained by the server from the blockchain system according to the pet identifier.

In some embodiments, the first display interface is further used for displaying genealogy information of the target virtual pet; and the display module 1560 is further configured to:

receive a third slide signal on the first display interface;

slide displayed content on the first display interface to a first direction according to the third slide signal;

obtain third information of the target virtual pet from the server in a case of sliding to a third location on the first display interface, where the third information is genealogy information that is stored on the blockchain system and that corresponds to the target virtual pet; and display the genealogy information of the target virtual pet in displayed content corresponding to the third location.

In some embodiments, the determining module 1520 is further configured to:

obtain pet information of m virtual pets from a server, where the pet information of the m virtual pets is summary information that is stored on a blockchain system and that is of the m virtual pets owned by a current user account, and m is a positive integer;

display a pet preview interface in the application program, where the pet preview interface is used for displaying the pet information of the m virtual pets owned by the current user account;

receive a selection signal triggered on the pet preview interface; and determine the target virtual pet in the m virtual pets according to the selection signal.

In some embodiments, a career information button is further displayed on the first display interface; and the display module 1560 is further configured to:

receive a first tapping signal triggered for the career information button on the first display interface;

obtain career information of the target virtual pet from the server according to the first tapping signal, where the career information includes k pieces of historical event journal information that are stored on the blockchain system and that are after birth of the target virtual pet, and k is a positive integer; and display a second display interface, where the career information of the target virtual pet is displayed on the second display interface.

In some embodiments, a trading information button is further displayed on the first display interface; and the display module 1560 is further configured to:

receive a second tapping signal triggered for the trading information button on the first display interface;

obtain blockchain trading information of the target virtual pet from the server according to the second tapping signal, where the blockchain trading information includes historical trading journal information of the target virtual pet stored on the blockchain system; and display a third display interface, where the blockchain trading information of the target virtual pet is displayed on the third display interface.

In some embodiments, a blockchain node control is further displayed on the pet preview interface; and the display module 1560 is further configured to:

receive a third tapping signal triggered for the blockchain node control on the first display interface;

obtain node status information of n blockchain nodes from the server according to the third tapping signal, where n is a positive integer; and display a fourth display interface, where the node status information of the n blockchain nodes is displayed on the fourth display interface.

To summarize, the terminal communicates with the blockchain system through the server, obtains the information corresponding to the target virtual pet stored on the blockchain system, and displays the display interface according to the information. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the display interface.

Figure 26:
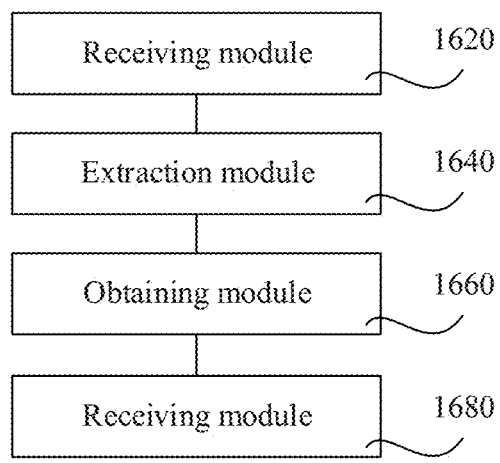
FIG. 26 is a block diagram of an apparatus for displaying a virtual pet according to another exemplary embodiment of this disclosure.

FIG. 26 is a block diagram of an apparatus for displaying a virtual pet according to an exemplary embodiment of this disclosure. The apparatus includes:

a receiving module 1620, configured to receive a first obtaining request transmitted by a terminal, the first obtaining request being transmitted by the terminal after the terminal determines a to-be-displayed target virtual pet in an application program;

an extraction module 1640, configured to extract a pet identifier of the target virtual pet on a blockchain system from the first obtaining request;

an obtaining module 1660, configured to obtain first information of the target virtual pet from the blockchain system according to the pet identifier; and a transmission module 1680, configured to transmit the first information to the terminal, the first information being used by the terminal to display a first display interface of the target virtual pet.

In some embodiments, the receiving module 1620 is further configured to:

receive a second obtaining request transmitted by the terminal, where the second obtaining request is transmitted by the terminal after sliding to a second location on the first display interface;

extract a pet identifier of the target virtual pet on a blockchain system from the second obtaining request;

obtain second information of a filial virtual pet from the blockchain system according to the pet identifier; and transmit the second information to the terminal, where the second information is used by the terminal to display information about the filial virtual pet in displayed content corresponding to the second location on the first display interface.

In some embodiments, the receiving module 1620 is further configured to:

receive a third obtaining request transmitted by the terminal, where the third obtaining request is transmitted by the terminal after sliding to a third location on the first display interface;

extract a pet identifier of the target virtual pet on a blockchain system from the third obtaining request;

obtain genealogy information corresponding to the target virtual pet from the blockchain system according to the pet identifier; and transmit the genealogy information to the terminal, where the genealogy information is used by the terminal to display the genealogy information in displayed content corresponding to the third location on the first display interface.

In some embodiments, the receiving module 1620 is further configured to:

receive a fourth obtaining request transmitted by the terminal, where the fourth obtaining request is transmitted by the terminal after a career information button on the first display interface is triggered;

extract first identification information from the fourth obtaining request;

obtain k pieces of historical event journal information after birth of the target virtual pet from the blockchain system according to the first identification information, and obtaining career information of the target virtual pet, where k is a positive integer; and transmit the career information of the target virtual pet to the terminal, where the career information is used by the terminal to display a second display interface of the target virtual pet.

In some embodiments, the receiving module 1620 is further configured to:

receive a fifth obtaining request transmitted by the terminal, where the fifth obtaining request is transmitted by the terminal after a trading information button on the first display interface is triggered;

extract second identification information from the fifth obtaining request;

obtain blockchain trading information of the target virtual pet from the blockchain system according to the second identification information; and transmit the blockchain trading information to the terminal, the blockchain trading information being used by the terminal to display a third display interface of the target virtual pet.

In some embodiments, the receiving module 1620 is further configured to:

receive a preview obtaining request transmitted by the terminal;

extract a current user account from the preview obtaining request;

determine a corresponding target account of the current user account on the blockchain system;

obtain summary information of m virtual pets from the blockchain system according to the target account; and transmit the summary information of the m virtual pets to the terminal, the summary information being used by the terminal to display a pet preview interface.

In some embodiments, the receiving module 1620 is further configured to: receive a node information obtaining request transmitted by the terminal;

obtain node status information of n blockchain nodes from the blockchain system, n being a positive integer; and transmit the node status information of the n blockchain nodes to the terminal, the node status information of the n blockchain nodes being used by the terminal to display a fourth display interface.

To summarize, the terminal communicates with the blockchain system through the server, obtains the information corresponding to the target virtual pet stored on the blockchain system, and displays the display interface according to the information. Because information stored in the blockchain system is information confirmed through a consensus algorithm for a plurality of nodes, the problem in the related art that information displayed on the user interface may be tampered with or replicated from corresponding information of another virtual pet can be avoided, thereby ensuring authenticity and uniqueness of the information about the target virtual pet displayed on the display interface.

Figure 27:
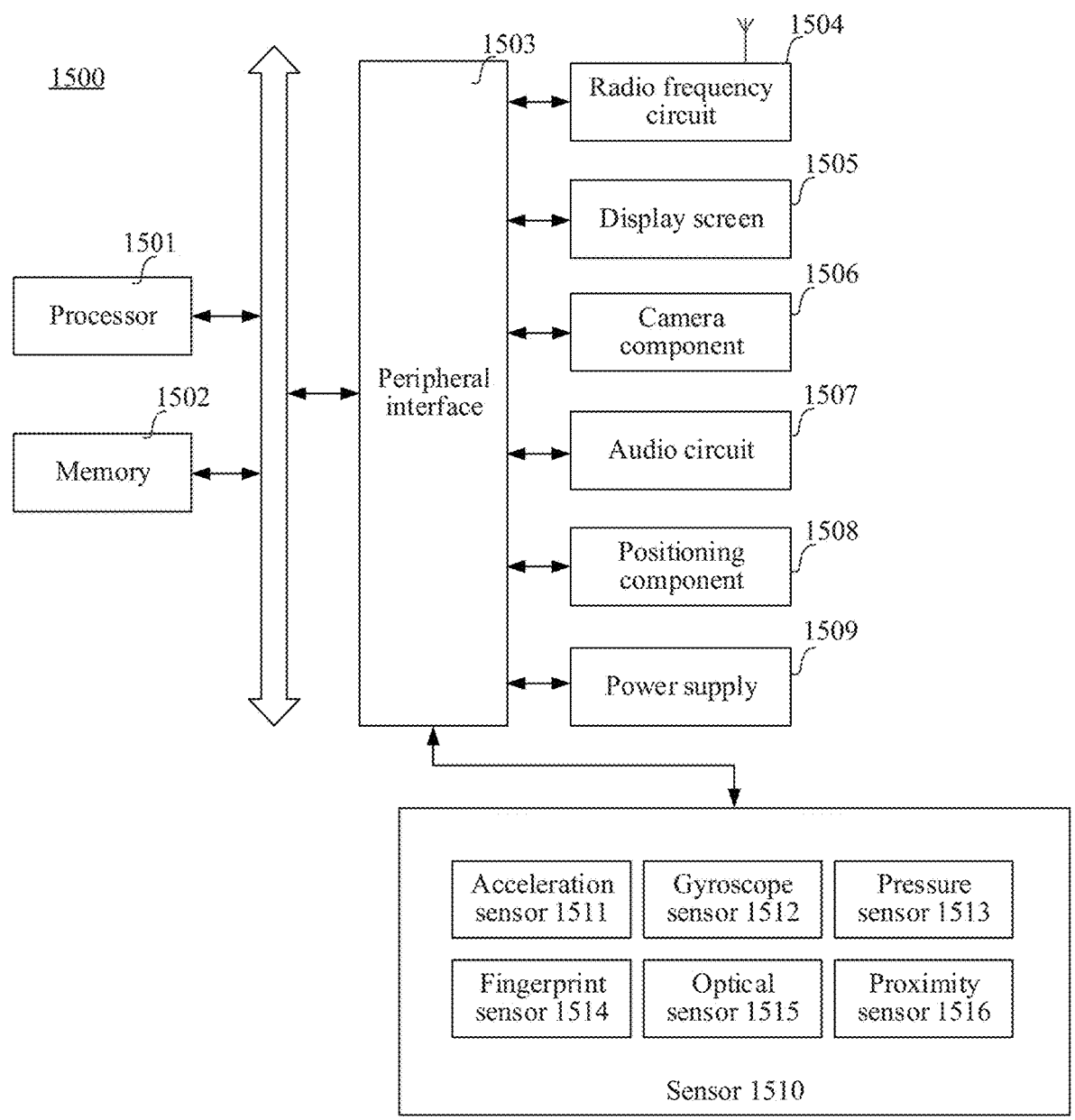
FIG. 27 is a block diagram of an apparatus for displaying a virtual pet according to another exemplary embodiment of this disclosure.

FIG. 27 is a structural block diagram of a terminal 1500 according to an exemplary embodiment of this disclosure. The terminal 1500 may be a smartphone, a tablet computer, a Moving Picture Experts Group Audio Layer III (MP3) player, a Moving Picture Experts Group Audio Layer IV (MP4) player, a notebook computer or a desktop computer. The terminal 1500 may be further referred to as user equipment, a portable terminal, a laptop terminal, a desktop terminal or another name.

For example, the terminal 1500 includes: a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA). The processor 1501 may alternatively include a main processor and a coprocessor. The main processor is configured to process data in an awake state, also referred to as a central processing unit (CPU); and the coprocessor is a low-power processor configured to process data in a standby state. In some embodiments, the processor 1501 may be integrated with a graphics processing unit (GPU). The GPU is configured to be responsible for rendering and drawing content that a display screen needs to display. In some embodiments, the processor 1501 may further include an artificial intelligence (AI) processor. The AI processor is configured to process a computing operation related to machine learning.

The memory 1502 may include one or more computer-readable storage media. The computer-readable storage medium may be non-transient. The memory 1502 may further include a high-speed random access memory and a non-volatile memory such as one or more magnetic disk storage devices and a flash storage device. In some embodiments, the non-transitory computer-readable storage medium in the memory 1502 is configured to store at least one instruction, and the at least one instruction being configured to be executed by the processor 1501 to implement a method for displaying a virtual pet provided in the method embodiments of this application.

In some embodiments, the terminal 1500 further optionally includes a peripheral interface 1503 and at least one peripheral. The processor 1501, the memory 1502, and the peripheral interface 1503 may be connected through a bus or a signal cable. Each peripheral may be connected to the peripheral interface 1503 through a bus, a signal cable, or a circuit board. Specifically, the peripheral includes: at least one of a radio frequency (RF) circuit 1504, a touch display screen 1505, a camera component 1506, an audio circuit 1507, a positioning component 1508, and a power supply 1509.

The peripheral interface 1503 may be configured to connect at least one peripheral related to input/output (I/O) to the processor 1501 and the memory 1502. In some embodiments, the processor 1501, the memory 1502, and the peripheral interface 1503 are integrated into a same chip or circuit board; and in some other embodiments, any one or two of the processor 1501, the memory 1502, and the peripheral interface 1503 may be implemented on an independent chip or circuit board. This is not limited in this embodiment.

The RF circuit 1504 may be configured to receive and transmit an RF signal, which is also referred to as an electromagnetic signal. The radio frequency circuit 1504 communicates with a communication network and another communication device by using the electromagnetic signal. The RF circuit 1504 converts an electric signal into an electromagnetic signal for transmission, or converts a received electromagnetic signal into an electric signal. Optionally, the RF circuit 1504 may include: an antenna system, an RF transceiver, one or more amplifiers, a tuner, an oscillator, a digital signal processor, a codec chip set, a subscriber identity module card, and the like. The RF circuit 1504 may communicate with other terminals through at least one wireless communication protocol. The wireless communication protocol includes, but is not limited to: World Wide Web, a metropolitan area network, an intranet, various generations of mobile communication networks (2G, 3G, 4G, and 5G), a wireless local area network and/or a wireless fidelity (Wi-Fi) network. In some embodiments, the RF circuit 1504 may also include a circuit related to near field communication (NFC). This is not limited in this application.

The display screen 1505 may be configured to display a user interface (UI). The UI may include a graph, a text, an icon, a video, and any combination thereof. When the display screen 1505 is a touch display screen, the display screen 1505 is further capable of acquiring a touch signal on or above a surface of the display screen 1505. The touch signal may be inputted to the processor 1501 for processing as a control signal. In this case, the display screen 1505 may be further configured to provide a virtual button and/or a virtual keyboard, which is also referred to as a soft button and/or a soft keyboard. In some embodiments, there may be one display screen 1505, disposed on a front panel of the terminal 1500. In other some embodiments, there may be at least two display screens 1505, disposed on different surfaces of the terminal 1500 respectively or in a folded design. In still other embodiments, the display screen 1505 may be a flexible display screen, disposed on a curved surface or a folded surface of the terminal 1500. Even, the display screen 1505 may be further set in a non-rectangular irregular pattern, namely, a special-shaped screen. The display screen 1505 may be prepared by using a material such as a liquid crystal display (LCD), an organic light-emitting diode (OLED), or the like.

The camera component 1506 may be configured to acquire an image or a video. Optionally, the camera component 1506 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, which are respectively any one of a main camera, a depth of field camera, a wide-angle camera, and a telephoto camera, to implement a background blurring function by fusing the main camera and the depth of field camera, and panoramic shooting and virtual reality (VR) shooting functions or other fusing shooting functions by fusing the main camera and the wide-angle camera. In some embodiments, the camera component 1506 may further include a flash. The flash may be a single color temperature flash, or may be a double color temperature flash. The double color temperature flash is a combination of a warm light flash and a cold light flash, and may be used for light compensation under different color temperatures.

The audio circuit 1507 may include a microphone and a speaker. The microphone is configured to: acquire sound waves of a user and an environment, and convert the sound waves into electrical signals and input the electrical signals into the processor 1501 for processing, or input the electrical signals into the RF circuit 1504 to implement speech communication. For the purpose of stereo collection or noise reduction, there may be a plurality of microphones, disposed at different parts of the terminal 1500 respectively. The microphone may be further an array microphone or an omnidirectional collection microphone. The speaker is configured to convert electrical signals from the processor 1501 or the RF circuit 1504 into sound waves. The speaker may be a conventional thin-film speaker, or may be a piezoelectric ceramic speaker. When the speaker is the piezoelectric ceramic speaker, electrical signals not only can be converted into sound waves that can be heard by human, but also can be converted into sound waves that cannot be heard by human for ranging and other uses. In some embodiments, the audio circuit 1507 may also include an earphone jack.

The positioning component 1508 may be configured to determine a current geographic location of the terminal 1500, to implement navigation or a location based service (LBS). The positioning component 1508 may be a positioning component based on the Global Positioning System (GPS) of the United States, the BeiDou system of China, the Global Navigation Satellite System (GLONASS) of Russia, or the GALILEO System of the European Union.

The power supply 1509 may be configured to supply power for various components in the terminal 1500. The power supply 1509 may be an alternating current, a direct current, a disposable battery, or a rechargeable battery. When the power supply 1509 includes a rechargeable battery, the rechargeable battery may be a wired rechargeable battery or a wireless rechargeable battery. The wired rechargeable battery is a battery that is charged by a wired line, and the wireless rechargeable battery is a battery that is charged by a wireless coil. The rechargeable battery may further be configured to support a quick charge technology.

In some embodiments, the terminal 1500 may also include one or more sensors 1510. The one or more sensors 1510 include, but are not limited to: an acceleration sensor 1511, a gyroscope sensor 1512, a pressure sensor 1513, a fingerprint sensor 1514, an optical sensor 1515, and a proximity sensor 1516.

The acceleration sensor 1511 may detect accelerations on three coordinate axes of a coordinate system established by the terminal 1500. For example, the acceleration sensor 1511 may be configured to detect components of the gravity acceleration on the three coordinate axes. The processor 1501 may control, according to a gravity acceleration signal collected by the acceleration sensor 1511, the touch display screen 1505 to display the user interface in a frame view or a portrait view. The acceleration sensor 1511 may be further configured to collect game or user motion data.

The gyroscope sensor 1512 may detect a body direction and a rotation angle of the terminal 1500. The gyroscope sensor 1512 may collaborate with the acceleration sensor 1511 in collecting a 3D action of the user on the terminal 1500. The processor 1501 may implement the following functions according to the data collected by the gyroscope sensor 1512: motion sensing (such as changing the UI according to a tilt operation of the user), image stabilization during shooting, game control, and inertial navigation.

The pressure sensor 1513 may be disposed on a side frame of the terminal 1500 and/or a lower layer of the touch display screen 1505. When the pressure sensor 1513 is disposed on the side frame of the terminal 1500, a holding signal of the user to the terminal 1500 may be detected, and left/right hand identification or a quick action may be performed by the processor 1501 according to the holding signal collected by the pressure sensor 1513. When the pressure sensor 1513 is disposed on the lower layer of the touch display 1505, the processor 1501 controls an operable control on the UI interface according to a pressure operation of the user on the touch display 1505. The operable control includes at least one of a button control, a scroll bar control, an icon control and a menu control.

The fingerprint sensor 1514 may be configured to collect a user's fingerprint, and the processor 1501 identifies a user's identity according to the fingerprint collected by the fingerprint sensor 1514, or the fingerprint sensor 1514 identifies a user's identity according to the collected fingerprint. When the identity of the user is identified as a trusted identity, the processor 1501 authorizes the user to perform a related sensitive operation. The sensitive operation may include unlocking a screen, viewing encryption information, downloading software, payment, changing settings, and the like. The fingerprint sensor 1514 may be disposed on a front face, a back face, or a side face of the terminal 1500. When a physical button or a vendor logo is disposed on the terminal 1500, the fingerprint sensor 1514 may be integrated together with the physical button or the vendor logo.

The optical sensor 1515 may be configured to collect ambient light intensity. In an embodiment, the processor 1501 may control the display brightness of the touch display screen 1505 according to the ambient light intensity collected by the optical sensor 1515. Specifically, when the ambient light intensity is relatively high, the display brightness of the touch display screen 1505 is turned up. When the ambient light intensity is relatively low, the display brightness of the touch display screen 1505 is turned down. In another embodiment, the processor 1501 may further dynamically adjust a camera parameter of the camera component 1506 according to the ambient light intensity collected by the optical sensor 1515.

The proximity sensor 1516, also referred to as a distance sensor, may be disposed on a front panel of the terminal 1500. The proximity sensor 1516 is configured to collect a distance between a user and the front surface of the terminal 1500. In an embodiment, when the proximity sensor 1516 detects that the distance between the user and the front surface of the terminal 1500 gradually decreases, the touch display 1501 is controlled by the processor 1505 to switch from a screen-on state to a screen-off state. When the proximity sensor 1516 detects that the distance between the user and the front surface of the terminal 1500 gradually increases, the touch display 1501 is controlled by the processor 1505 to switch from the screen-off state to the screen-on state.

A person skilled in the art may understand that the structure shown in FIG. 27 does not constitute a limitation on the terminal 1500, and the terminal may include more or fewer components than those shown in the figure, or some components may be combined, or a different component deployment may be used.

This application further provides a computer-readable storage medium, storing at least one computer-readable instruction, at least one program, a code set or an instruction set, the at least one computer-readable instruction, the at least one program, the code set or the instruction set being loaded and executed by a processor to implement a method for displaying a virtual pet provided in the foregoing method embodiments.

Figure 28:
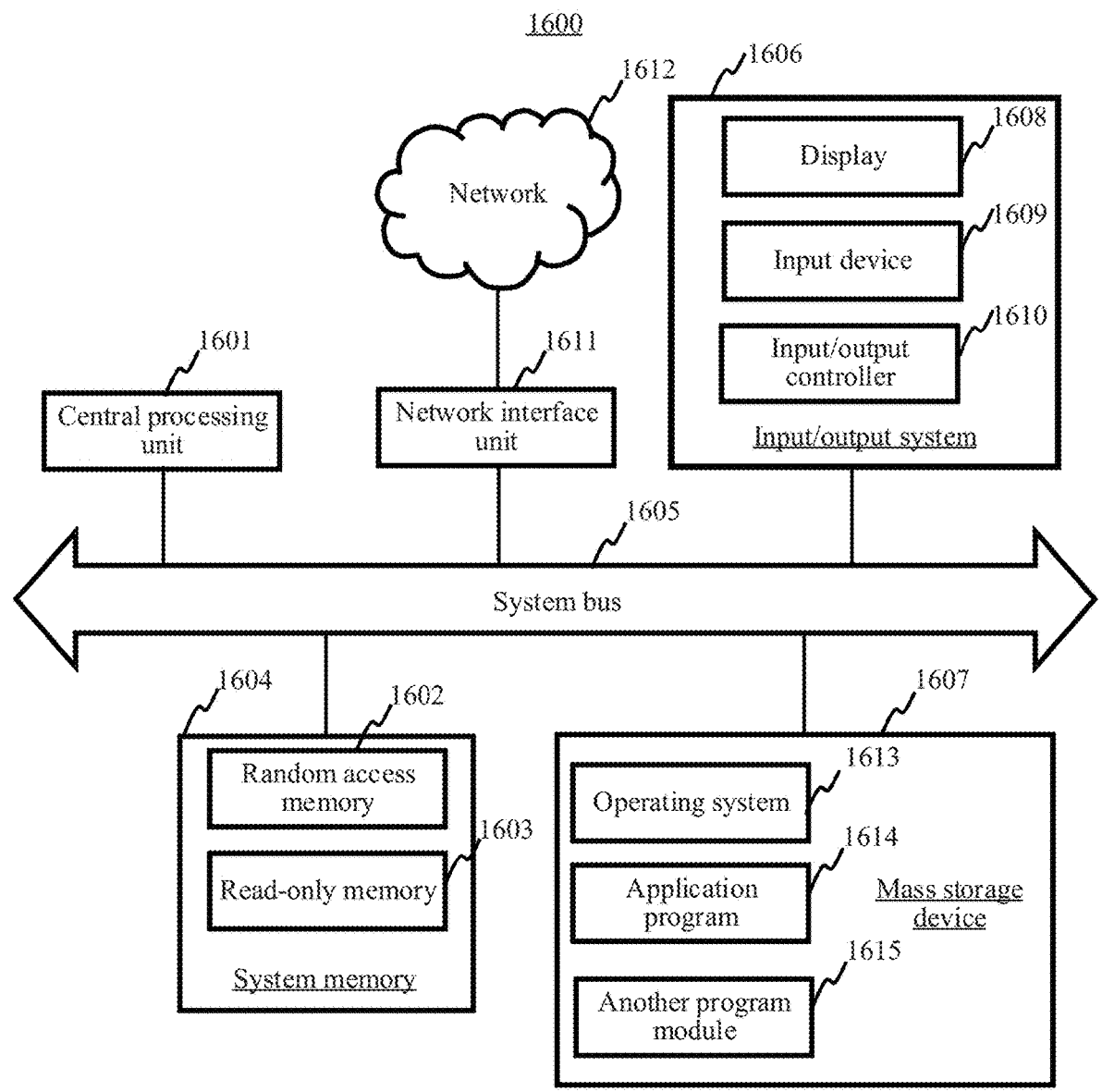
FIG. 28 is a block diagram of an apparatus for displaying a virtual pet according to another exemplary embodiment of this disclosure.

FIG. 28 is a schematic structural diagram of a server according to an embodiment of this disclosure. Specifically, the server 1600 may include a Central Processing Unit (CPU) 1601, a system memory 1604 including a random access memory (RAM) 1602 and a read-only memory (ROM) 1603, and a system bus 1605 connecting the system memory 1604 and the CPU 1601. The server 1600 may further include a basic input/output system (I/O system) 1606 assisting in transmitting information between devices in a computer, and a mass storage device 1607 configured to store an operating system 1613, an application program 1614 and another program module 1615.

The basic I/O system 1606 includes a display 1608 configured to display information and an input device 1609, such as a mouse or a keyboard, configured to input information for a user. The display 1608 and the input device 1609 are both connected to the CPU 1601 by using an input/output controller 1610 connected to the system bus 1605. The basic I/O system 1606 may further include the input/output controller 1610 to be configured to receive and process inputs from multiple other devices such as a keyboard, a mouse, and an electronic stylus. Similarly, the input/output controller 1610 further provides an output to a display screen, a printer or another type of output device.

The mass storage device 1607 is connected to the CPU 1601 by using a mass storage controller (not shown) connected to the system bus 1605. The mass storage device 1607 and its associated computer readable medium provide non-volatile storage for the server 1600. That is, the mass storage device 1607 may include a computer-readable medium (not shown) such as a hard disk or a compact disc ROM (CD-ROM) drive.

Without loss of generality, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, persons skilled in art can know that the computer storage medium is not limited to the foregoing several types. The system memory 1604 and the mass storage device 1607 may be collectively referred to as a memory.

According to various embodiments of this application, the server 1600 may further be connected, by using a network such as the Internet, to a remote computer on the network and run. That is, the server 1600 may be connected to a network 1612 by using a network interface unit 1611 connected to the system bus 1605, or may be connected to another type of network or remote computer system (not shown) by using the network interface unit 1611.

This application further provides a computer-readable instruction, the computer-readable instruction, when run on an electronic device, causing the electronic device to perform the method for displaying a virtual pet in the foregoing method embodiments.

A person of ordinary skill in the art may understand that all or some of the steps of the embodiments may be implemented by hardware or a computer-readable instruction instructing related hardware. The computer-readable instruction may be stored in a computer-readable storage medium. The storage medium may include a read-only memory, a magnetic disk, or an optical disc.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method performed in a platform for maintaining a type of virtual pets, comprising:
    generating a plurality of initial gene sequences associated with the type of virtual pets;
    generating a plurality of zeroth generation virtual pets corresponding to the plurality of initial gene sequences;
    generating a plurality of higher generation virtual pets originating from the plurality of zeroth generation virtual pets via a set of virtual breeding events, each of the plurality of higher generation virtual pets comprising a gene sequence generated using a genetic inheritance algorithm;
    maintaining a uniqueness of the gene sequences among the plurality of zeroth and higher generation virtual pets;
    storing a set of data items for each of the plurality of zeroth and higher generation virtual pets in a blockchain system; and
    transacting at least one virtual pet of the plurality of zeroth and higher generation virtual pets via the blockchain system,
    wherein each of the plurality of zeroth and higher generation virtual pets are associated with a set of intrinsic characteristics and extrinsic characteristics determined by a corresponding gene sequence.

2. The method of claim 1, wherein maintaining the uniqueness of the gene sequences among the plurality of zeroth or higher generation virtual pets comprises maintaining the uniqueness of the gene sequences by identifying a virtual pet having an identical gene sequence to another virtual pet among the plurality of zeroth and higher generation virtual pets and regenerating its gene sequence until the uniqueness of the gene sequences is obtained.

3. The method of claim 1, wherein the set of intrinsic characteristics and extrinsic characteristics of a virtual pet is determined by its subset of inheritance genes among a gene sequence corresponding to the virtual pet according to a set of genetic inheritance rules.

4. The method of claim 3, wherein:
    the extrinsic characteristics of the virtual pet comprise at least one physical appearance feature of at least one body part of the virtual pet;
    the at least one body part of the virtual pet comprises at least one of a skin, an ear, an eye, a mouth, or a tail; and
    the at least one physical appearance feature comprises at least one of color, color pattern, shape, or texture.

5. The method of claim 3, wherein the intrinsic characteristics of the virtual pet comprise at least one of an intelligence level, an attacking power, a defense power, a dexterity, a strength, an endurance, an agility, a speed, or a health condition.

6. The method of claim 3, wherein the gene sequence of each of the plurality of zeroth and higher generation virtual pets comprises a sequence of gene name-value pairs.

7. The method of claim 3, wherein the gene sequence of each of the plurality of higher generation virtual pets are generated by gene combination of its parental virtual pets according to the genetic inheritance algorithm.

8. The method of claim 3, wherein the set of data items for a virtual pet of the plurality of zeroth and higher generation virtual pets stored in the blockchain system comprise a unique gene sequence of the virtual pet and at least one of an identifier, parent identifiers, generation information, genealogy information, historical transaction journal information, or historical life event information of the virtual pet.

9. The method of claim 3, wherein transacting the at least one virtual pet of the plurality of zeroth and higher generation virtual pets via the blockchain system comprises at least one of:
    trading the at least one virtual pet via one or more application programs; or
    providing the at least one virtual pet for breeding via one or more application programs.

10. The method of claim 3, further comprising:
    receiving a request from an application program for displaying a virtual pet associated with a virtual pet identifier;
    querying the blockchain system according to the virtual pet identifier to retrieve the set of data items associated with the virtual pet; and
    generating a display interface from the set of data items for the application program.

11. The method of claim 10, wherein generating the display interface from the set of data items for the application program comprises generating an image of the virtual pet comprising the set of extrinsic characteristics of the virtual pet extracted from the set of data items according to the set of genetic inheritance rules.

12. The method of claim 11, wherein the display interface further comprises a list of the extrinsic characteristics of the virtual pet extracted from the set of data items according to the set of genetic inheritance rules.

13. The method of claim 10, wherein the display interface comprises a list of parental or filial virtual pets associated with the virtual pet extracted from the set of data items.

14. The method of claim 10, wherein the display interface comprises a chain of generation information associated with the virtual pet extracted from the set of data items.

15. The method of claim 10, wherein the display interface comprises genealogy information associated with the virtual pet extracted from the set of data items.

16. The method of claim 10, wherein the display interface comprises transactional information associated with the virtual pet extracted from the set of data items.

17. The method of claim 10, wherein the display interface comprises life event information associated with the virtual pet extracted from the set of data items.

18. A system for maintaining a type of virtual pets comprising a memory for storing at least one computer-readable instruction, and a processor configured to execute the at least one computer-readable instruction to:
generate a plurality of unique initial gene sequences associated with the type of virtual pets;
generate a plurality of zeroth generation virtual pets corresponding to the plurality of initial gene sequences;
generate a plurality of higher generation virtual pets originating from the plurality of zeroth generation virtual pets via a set of virtual breeding events, each of the plurality of higher generation virtual pets comprising a gene sequence generated using a genetic inheritance algorithm;
maintain a uniqueness of the gene sequences among the plurality of zeroth or higher generation virtual pets;
store a set of data items for each of the plurality of zeroth and higher generation virtual pets in a blockchain system; and
transact at least one virtual pet of the plurality of zeroth and higher generation virtual pets via the blockchain system,
wherein each of the plurality of zeroth and higher generation virtual pets are associated with a set of intrinsic characteristics and extrinsic characteristics determined by a corresponding gene sequence.

19. The system of claim 18, wherein to maintain the uniqueness of the gene sequences among the plurality of zeroth or higher generation virtual pets comprises:
to maintain the uniqueness of the gene sequences by identifying a virtual pet having an identical gene sequence to another virtual pet among the plurality of zeroth and higher generation virtual pets and regenerating its gene sequence until the uniqueness of the gene sequences is obtained.

20. A non volatile non-transitory computer-readable storage medium, storing at least one computer-readable instruction, wherein the at least one computer-readable instruction, when executed by a processor, causes the processor to maintain a type of virtual pets by:
generating a plurality of unique initial gene sequences associated with the type of virtual pets;
generating a plurality of zeroth generation virtual pets corresponding to the plurality of initial gene sequences;
generating a plurality of higher generation virtual pets originating from the plurality of zeroth generation virtual pets via a set of virtual breeding events, each of the plurality of higher generation virtual pets comprising a gene sequence generated using a genetic inheritance algorithm;
maintaining a uniqueness of the gene sequences among the plurality of zeroth or higher generation virtual pets;
storing a set of data items for each of the plurality of zeroth and higher generation virtual pets in a blockchain system; and
transacting at least one virtual pet of the plurality of zeroth and higher generation virtual pets via the blockchain system,
wherein each of the plurality of zeroth and higher generation virtual pets are associated with a set of intrinsic characteristics and extrinsic characteristics determined by a corresponding gene sequence.

* * * * *